US012572735B2

(12) United States Patent
Rahman et al.

(10) Patent No.: US 12,572,735 B2
(45) Date of Patent: Mar. 10, 2026

(54) DOMAIN-SPECIFIC DOCUMENT VALIDATION

(71) Applicant: Otsuka Pharmaceutical Development & Commercialization, Inc., Rockville, MD (US)

(72) Inventors: Mohammed Arifur Rahman, Princeton, NJ (US); Nityanand Choubey, Princeton, NJ (US); Imtiaz Mohiuddin, Princeton, NJ (US); Paresh Patel, Princeton, NJ (US); Babu Sudhagar Raj Thiravidamani, Princeton, NJ (US); Mehul Shah, Princeton, NJ (US)

(73) Assignee: Otsuka Pharmaceutical Development & Commercialization, Inc., Rockville, MD (US)

( * ) Notice: Subject to any disclaimer, the term of this patent is extended or adjusted under 35 U.S.C. 154(b) by 210 days.

(21) Appl. No.: 18/329,990

(22) Filed: Jun. 6, 2023

(65) Prior Publication Data

US 2023/0394235 A1     Dec. 7, 2023

Related U.S. Application Data

(60) Provisional application No. 63/349,432, filed on Jun. 6, 2022.

(51) Int. Cl.
*G06F 40/226* (2020.01)
*G06F 16/35* (2025.01)
(Continued)

(52) U.S. Cl.
CPC ............ *G06F 40/226* (2020.01); *G06F 16/35* (2019.01); *G06F 40/242* (2020.01); *G06F 40/284* (2020.01); *G06F 40/295* (2020.01)

(58) Field of Classification Search
CPC ...... G06F 40/226; G06F 16/35; G06F 40/242; G06F 40/284; G06F 40/295; G06F 16/9535; G06F 40/30
See application file for complete search history.

(56) References Cited

U.S. PATENT DOCUMENTS 6,212,494 B1 *  4/2001  Boguraev ............. G06F 40/289
                                                707/999.102
2006/0288285 A1 *  12/2006  Lai ........................ G06F 40/226
                                                715/708
(Continued)

OTHER PUBLICATIONS

Bhattacharyya, A., Chittimalli, P. K., & Naik, R. (Feb. 2018). Relation identification in business rules for domain-specific documents. In Proceedings of the 11th Innovations in Software Engineering Conference (pp. 1-5). (Year: 2018).*

*Primary Examiner* — Bhavesh M Mehta
*Assistant Examiner* — Philip H Lam
(74) *Attorney, Agent, or Firm* — Pillsbury Winthrop Shaw Pittman LLP

(57)     ABSTRACT

Systems and methods are described for automatically inspecting and validating unstructured documents having natural language text, such as journal article describing clinical research. For example, a journal's prose may be parsed to identify domain-specific entities and values. Domain-specific rules may be evaluated against generated structured data storing the entities and their corresponding values. rule may relate to a domain-specific requirement for the document. Findings may be generated for each evaluated rule, indicating whether the document meets a corresponding requirement. Feedback indicating whether a given finding is incorrect or is to be updated, which may indicate that the corresponding rule should be updated or removed, may be obtained. Based on the feedback, the set of domain-specific rules may be updated to obtain an updated set of (Continued)

rules including an update to or deletion of the rule. Some embodiments include automatically validating documents using voice enabled features.

19 Claims, 16 Drawing Sheets

(51) Int. Cl.
  *G06F 40/242*          (2020.01)
  *G06F 40/284*          (2020.01)
  *G06F 40/295*          (2020.01)

(56)                    References Cited

U.S. PATENT DOCUMENTS

| | | | |
|---|---|---|---|
| 2008/0005138 A1* | 1/2008 | Gauthier | G06F 16/88 |
| 2009/0106285 A1* | 4/2009 | Cheung | G06F 16/288 |
| 2019/0005012 A1* | 1/2019 | Priestas | G06N 20/00 |
| 2019/0042561 A1* | 2/2019 | Kakirwar | G06F 40/295 |
| 2019/0057078 A1* | 2/2019 | Boguraev | G06F 40/205 |
| 2019/0147370 A1* | 5/2019 | Botea | G16C 20/90 |
| | | | 706/11 |
| 2019/0236486 A1* | 8/2019 | Azab | G06N 20/00 |
| 2020/0279555 A1* | 9/2020 | Shapiro | G10L 15/22 |
| 2020/0403786 A1* | 12/2020 | de Matos | G06Q 20/3827 |
| 2021/0056442 A1* | 2/2021 | Pritchard | G06F 16/288 |
| 2022/0067828 A1* | 3/2022 | Gross | G06V 10/7784 |
| 2022/0179906 A1* | 6/2022 | Desai | G06F 16/93 |
| 2022/0309332 A1* | 9/2022 | V V Ganeshan | G06F 40/30 |
| 2024/0212687 A1* | 6/2024 | Kockerbeck | G06F 16/635 |

* cited by examiner

100

550

```
"metadata": {
    "source": "SRD-000646v1.0.docx",
    "generated_on": "2021-08-10 14:46:08.797769",
    "rule_type": "Template_Matching",
    "rule_key": "Rule_2"
},
"rule": {
    "sectionName": [
        "Scope"
    ],
    "lowerLevelSections": [
        {
            "sectionName": [
                "In Scope"
            ],
            "lowerLevelSections": [],
            "tables": [],
            "breadcrumb": [
                [
                    "Scope",
                    "In Scope"
                ]
            ]
        },
        {
            "sectionName": [
                "Out of Scope"
            ],
            "lowerLevelSections": [],
            "tables": [],
            "breadcrumb": [
                [
                    "Scope",
                    "Out of Scope"
                ]
            ]
        }
    ],
    "tables": [],
```

```
"metadata": {
    "source": "SME",
    "generated_on": "2021-08-10 14:49:50.317030",
    "rule_type": "Entity_Value_Extraction",
    "rule_key": "Rule_18"
},
"rule": {
    "sectionBreadCrumb": [
        []
    ],
    "entity": [
        "business criticality"
    ],
    "acceptable_values": [
        "high",
        "medium",
        "low",
        "moderate",
        "performed"
    ]
}
```

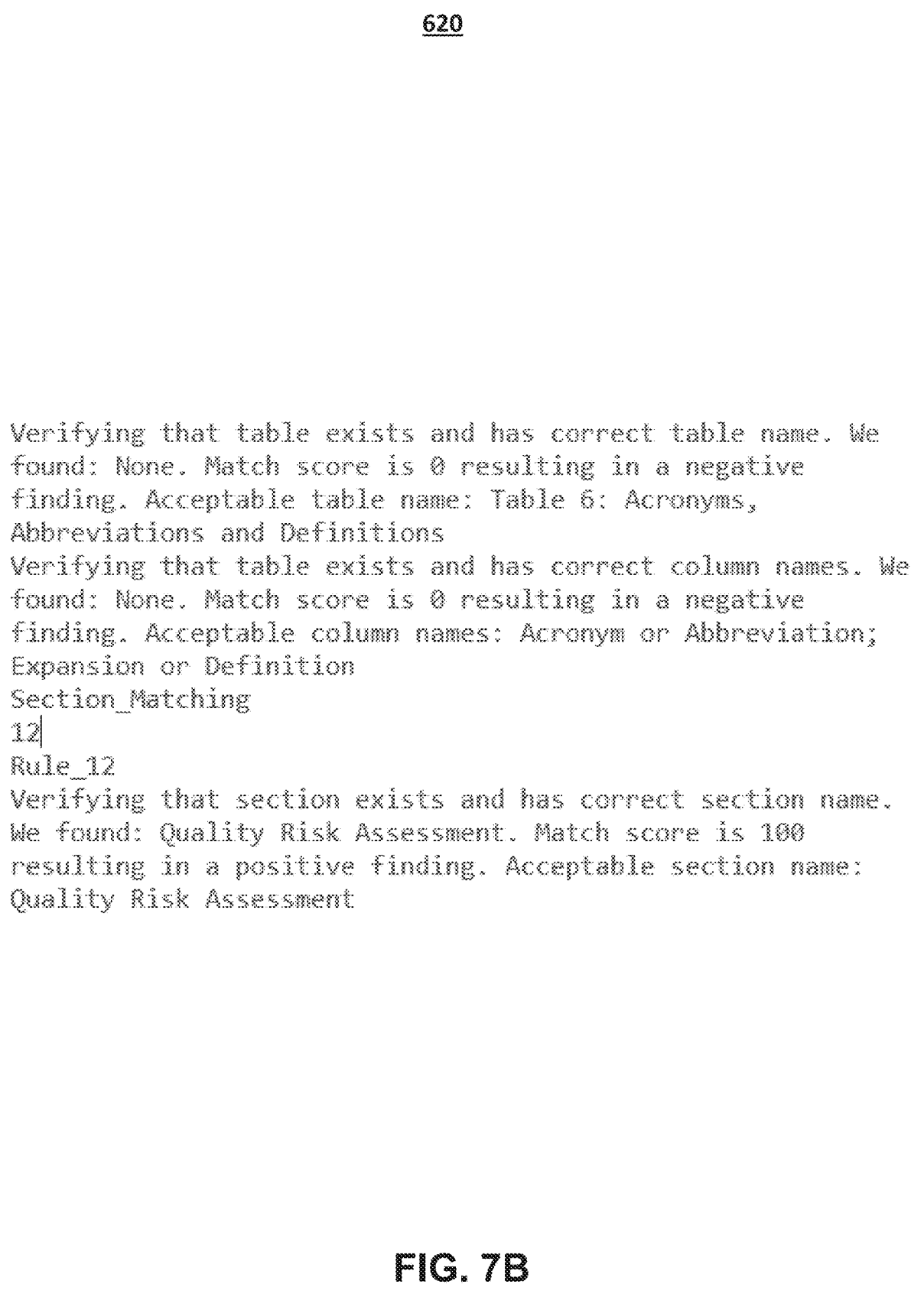

Verifying that table exists and has correct table name. We
found: None. Match score is 0 resulting in a negative
finding. Acceptable table name: Table 6: Acronyms,
Abbreviations and Definitions
Verifying that table exists and has correct column names. We
found: None. Match score is 0 resulting in a negative
finding. Acceptable column names: Acronym or Abbreviation;
Expansion or Definition
Section_Matching
12|
Rule_12
Verifying that section exists and has correct section name.
We found: Quality Risk Assessment. Match score is 100
resulting in a positive finding. Acceptable section name:
Quality Risk Assessment

FIG. 7B

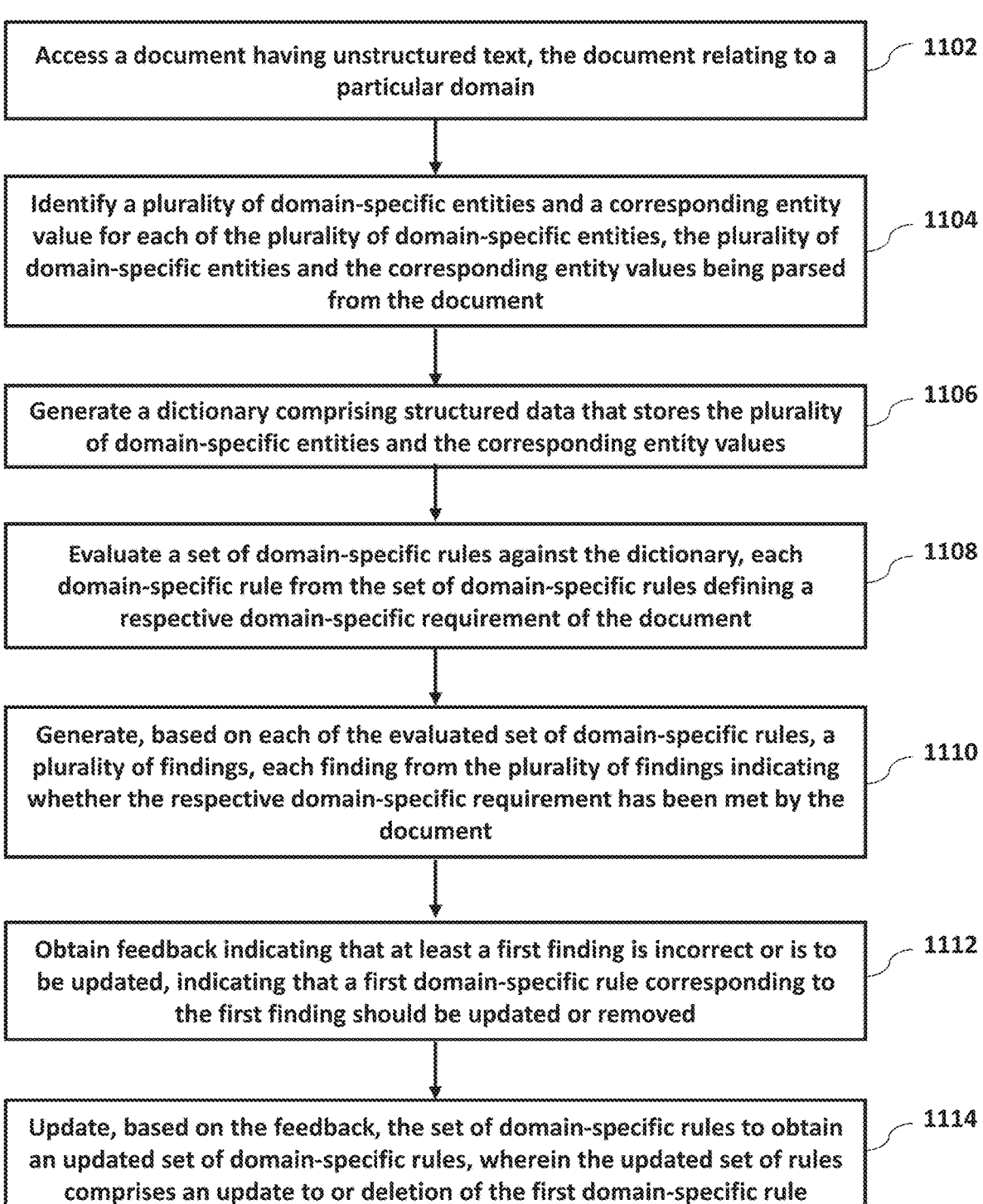

1100

Access a document having unstructured text, the document relating to a particular domain — 1102

Identify a plurality of domain-specific entities and a corresponding entity value for each of the plurality of domain-specific entities, the plurality of domain-specific entities and the corresponding entity values being parsed from the document — 1104

Generate a dictionary comprising structured data that stores the plurality of domain-specific entities and the corresponding entity values — 1106

Evaluate a set of domain-specific rules against the dictionary, each domain-specific rule from the set of domain-specific rules defining a respective domain-specific requirement of the document — 1108

Generate, based on each of the evaluated set of domain-specific rules, a plurality of findings, each finding from the plurality of findings indicating whether the respective domain-specific requirement has been met by the document — 1110

Obtain feedback indicating that at least a first finding is incorrect or is to be updated, indicating that a first domain-specific rule corresponding to the first finding should be updated or removed — 1112

Update, based on the feedback, the set of domain-specific rules to obtain an updated set of domain-specific rules, wherein the updated set of rules comprises an update to or deletion of the first domain-specific rule — 1114

Fig. 11

DOMAIN-SPECIFIC DOCUMENT VALIDATION

CROSS-REFERENCE TO RELATED APPLICATIONS

This application claims the benefit of the U.S. Provisional Patent Application No. 63/349,432; filed Jun. 6, 2022 and entitled "DOMAIN-SPECIFIC DOCUMENT VALIDA-TION" which is incorporated herein by reference in its entirety.

BACKGROUND

Document analysis may be a resource-consuming task, particularly as the number of documents increases into the millions or billions, and the number of rules to be analyzed against those documents expands. Furthermore, automation of document analysis may produce inaccurate results, which may impact the usefulness of some rules. Conventional document analysis techniques are unable to adapt and modify rules automatically to remove ineffective rules. Furthermore, conventional document analysis techniques are unable to derive new rules from patterns detected within analyzed documents and/or feedback obtained with respect to document analysis results.

BRIEF DESCRIPTION OF THE DRAWINGS

FIGS. 5B-5C are diagrams of pseudocode describing rules, in accordance with various embodiments.

FIG. 7B is a diagram of a generated message, in accordance with various embodiments.

FIG. 11 illustrates an example of a method of automatically validating unstructured documents having natural language text, in accordance with various embodiments.

DETAILED DESCRIPTION

Figure 1:
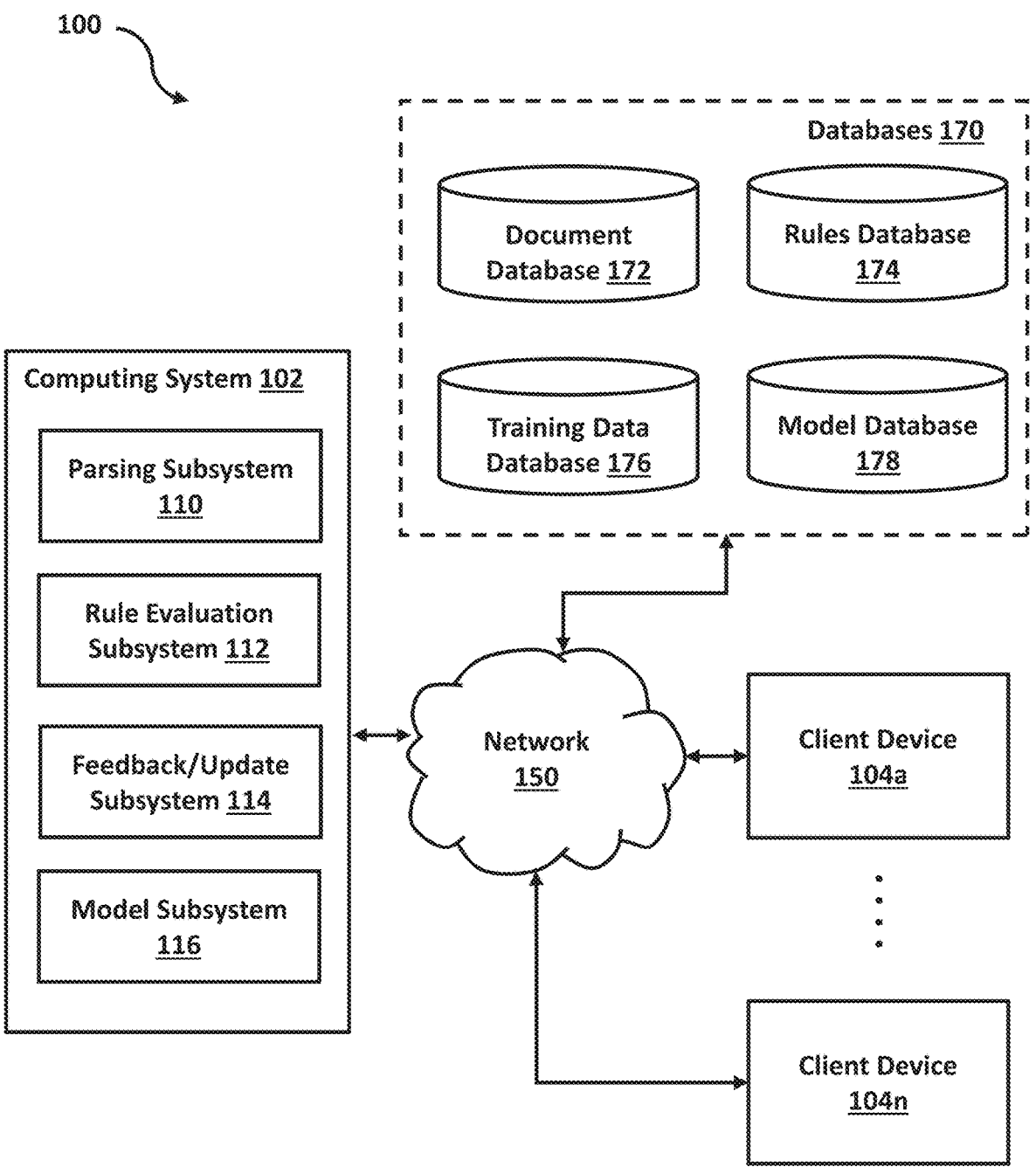
FIG. 1 is a diagram of an example of a system for automatically validating unstructured documents having natural language text, in accordance with various embodiments.

The disclosure relates to systems and methods of automatically validating documents having natural language text. Documents to be validated may include content such as graphics or text, which may be structured or unstructured. A given document to be validated may relate to a specific domain. A domain refers to a particular area or subject matter. Examples of domains include a healthcare domain, a finance domain, a legal domain, and/or other types of areas or subject matter. Automatically validating a document may include evaluating the document against one or more domain-specific rules. For example, a document in the healthcare domain may be evaluated against a set of domain-specific rules relating to healthcare. A document in the finance domain may be evaluated against a set of domain-specific rules relating to finance, and so on. Systems described herein may automatically learn and adjust the set of domain-specific rules.

The set of domain-specific rules may include a template matching rule, an entity-value matching rule, a text summarization rule, an audit historical findings rule, and/or other entity-specific rules. The template matching rule may require that certain content such as section names, subsection names, table names, table column names, and/or other content are present. In some examples, the template matching rule may require that the content appear in a certain order in the document being validated.

The entity-value matching rule may require certain named entities extracted from the document are associated with values in the document that are allowed. To evaluate the entity-value matching rule, the system may perform entity extraction on the text contained in the document to identify the entities and parse relevant values from the document.

The text summarization rule may require that the text in the document contains required topics to be covered based on a corpus of documents in the domain. To evaluate the rule, the system may use a composite similarity metric among the document being validated and the corpus of documents in the domain.

The audit historical findings rule may specify that rules be created based on grammatical structures in historical findings, identify named entities and prescribed actions, and generate rules based on the grammatical structures, named entities, and prescribed actions.

Evaluating any of the foregoing examples and/or other domain-specific rules against a document may include obtaining findings that indicate whether the document meets a particular domain-specific requirement defined by a respective domain-specific rule. In some embodiments, feedback regarding the finding may be obtained. The feedback may be used to determine whether a particular finding is correct. For example, the findings may be provided to a domain-specific expert system, whereby feedback regarding some or all of the findings may be provided. In some embodiments, the feedback may be used to update the set of domain-specific rules. For example, feedback may indicate that a particular finding corresponding to a particular domain-specific rule is incorrect or should be updated. This feedback may indicate that the particular domain-specific rule (such as corresponding to the particular finding) should be updated or removed. Thus, the system may be configured to update the set of domain-specific rules such that the updated set of domain-specific rules includes an updated version of the particular domain-specific rule or has the particular domain-specific rule removed from the set of domain-specific rules. As another example, feedback may indicate that a particular finding, corresponding to a particular doamin-specific rule, is correct. This feedback may indicate that the particular domain-specific rule should not be updated or removed from the set of domain-specific rules and, therefore, the system may keep the set of domain-specific rules static.

In some embodiments, machine learning techniques may be used to improve the performance of the system when evaluating documents against a set of rules. For example, natural language processing techniques may be used to extract text elements from documents to detect imprecise wording, determine a document's intent, compute similarity metrics with respect to format and topics of the document, or perform other operations. Furthermore, machine learning techniques may be used to determine a criticality level of a document, a document's findings, or other aspects of the document, or a combination thereof. The criticality level may be leveraged to determine a schedule with which documents are to be analyzed. For example, a document may have a criticality level (such as High) indicating that that document should be evaluated prior to another document having a "lower" criticality level. In some embodiments, a machine learning model may be trained to predict a criticality level of a document. The machine learning model may be trained using training documents including labels indicating a respective criticality level of the training documents.

While audit management software and business rules engines exist, these tools are unable to automatically verify rules evaluated against documents and are unable to execute multiple, complex, rules. Furthermore, the rules implemented by these tools are simplistic (such as checking whether a file exists), and are unable to perform advanced analysis (such as understand the contents of a document and make a determination based on the understood contents). Thus, the technical solutions described herein overcome the aforementioned and other technical problems found with existing technologies. Some example technical solutions provided herein include defining rules that are flexible, automatically generating new rules and expected results for those rules, accepting and updating rules based on feedback, and selecting domain-specific rules based on a domain a document is determined to relate to.

FIG. 1 is a diagram of an example of a system 100 for automatically validating unstructured documents having natural language text, in accordance with various embodiments. Natural language text, which may also be referred to herein interchangeably as "unstructured text," "unstructured text data," "raw text," or "raw text data," refers to information that is not stored in a predefined data model or organized using a predefined data structure. Unstructured text is primarily composed of prose, and may include dates, numbers, and/or other forms of data. An example of unstructured data is unstructured text in journal articles. Structured data, on the other hand, has a predefined format, which may be standardized across several sources (or which may be transformed into a standardized form). An example of structured data includes clinical trial data records that are stored in clinical trial repositories using named data fields that store clinical trial data. Automatically validating documents may include a system configured for determining a domain of a document, evaluating the document against a set of domain-specific rules, obtaining findings indicative of whether a domain-specific requirement defined by a given domain-specific rule was met, obtaining feedback regarding the findings, and determining whether the set of domain-specific rules should be updated based on the feedback.

In some embodiments, system 100 may include computing system 102, client devices 104a-104n (which are referred to interchangeably as "client device 104" or "client devices 104" unless specified otherwise), and databases 170. Computing system 102 and client device 104 may communicate with one another via network 150. Although a single instance of computing system 102 is represented within system 100, multiple instances of computing system 102 may be included, and the single instance of computing system 102 is to minimize obfuscation within FIG. 1. For example, system 100 may include multiple computer systems working together to perform operations associated with computing system 102.

Network 150 may be a communications network including one or more Internet Service Providers (ISPs). Each ISP may be operable to provide Internet services, telephonic services, and the like, to one or more client devices, such as client device 104. In some embodiments, network 150 may facilitate communications via one or more communication protocols, such as those mentioned above (for example, TCP/IP, HTTP, WebRTC, SIP, WAP, Wi-Fi (for example, 802.11 protocol), Bluetooth, radio frequency systems (for example, 900 MHz, 1.4 GHz, and 5.6 GHz communication systems), cellular networks (for example, GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, and/or VOIP.

Client device 104 may send requests (for example, queries for documents) and obtain results of the requests from computing system 102. Client device 104 may include one or more processors, memory, communications components, and/or additional components (for example, display interfaces, input devices, etc.). Client device 104 may include any type of mobile terminal, fixed terminal, or other device. By way of example, client device 104 may include a desktop computer, a notebook computer, a tablet computer, a smartphone, a wearable device, or other client device. Users may, for instance, utilize client device 104 to interact with one another, one or more servers, or other components of system 100. For example, computing system 102 may host a web-based interface for accessing documents stored in document database 172, and an end user may submit, using client device 104, a query via the web-based interface for documents.

Computing system 102 may include one or more subsystems, such as parsing subsystem 110, rule evaluation subsystem 112, feedback/update subsystem 114, model subsystem 116, or other subsystems. Computing system 102 may include one or more processors, memory, and communications components for interacting with different aspects of system 100. In some embodiments, computer program instructions may be stored within memory, and upon execution of the computer program instructions by the processors, operations related to some or all of subsystems 110-116 may be executed by computing system 102. In some embodiments, subsystems 110-116 may be implemented in hardware, such as firmware.

Figure 2:
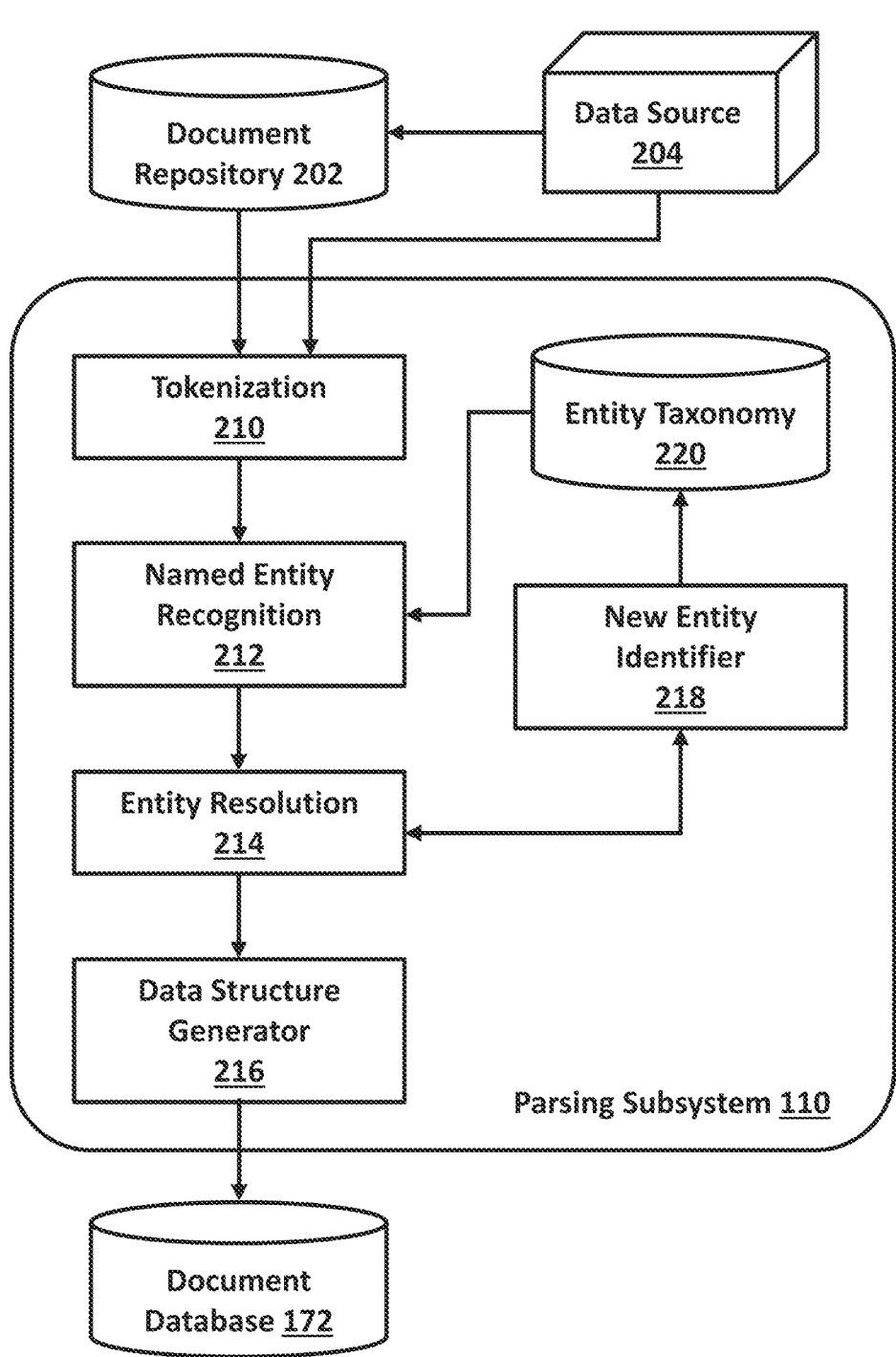
FIG. 2 is a diagram of a parsing subsystem used to parse unstructured text and perform other natural language processing operations, in accordance with various embodiments.

In some embodiments, parsing subsystem 110 may be configured to parse a document having unstructured text to obtain a data structure configured to store domain-specific entities and entity values corresponding to the domain-specific entities. As an example, with reference to FIG. 2, parsing subsystem 110 may be configured to perform one or more speech processing steps. For instance, parsing subsystem 110 may include a tokenization process 210, a named entity recognition (NER) process 212, an entity resolution (ER) process, or other processes. In some embodiments, one or more documents may be retrieved from document repository 202. Documents stored within document repository 202 may include unstructured text data. For example, the documents may include natural language prose, numbers, letters, and the like. In some embodiments, the documents may be derived from spoken utterances, which may then be converted from audio to text using speech-to-text (STT) processing. In some embodiments, the documents may include a document identifier that uniquely identifies each document. For example, if the document represents a journal article or technical paper, an identifier of a clinical trial associated with that paper may be stored as metadata with the document. Additionally, the documents may include timestamps indicating a time (such as a date) when the document was stored within document repository 202, published, created, etc., and the documents stored within document repository 202 may be organized temporally. In some embodiments, documents may be provided to parsing subsystem 110 from a data source 204. Data source 204 may be configured to provide real-time data to parsing subsystem 110. Some embodiments include data source 204 being a client device configured to provide a document to computing system 102 for analysis.

Tokenization process 210 may include segmenting text into semantic chunks, representing words, numbers, punctuation, and/or other formatting characters. The text may include the unstructured text included within a document stored within document repository 202, obtained from data source 204, or provided from another system/source. Tokenization process 210 may execute a process that converts a sequence of characters into a sequence of tokens, which may also be referred to as text tokens or lexical token. Each token may include a string of characters having a known meaning. The tokens may form an entity/value pair. The various different types of tokens may include identifiers, keywords, delimiters, operators, and/or other token types. For instance, a given text string, such as a sentence (for example, including p terms), may be split into p tokens based on detection of delimiters (for example, a comma, space, etc.), and may assign characters forming each token (for example, "values") to each token. Tokenization process 210 may also perform parsing to segment text (for example, sequences of characters or values) into subsets of text. For example, the parsing may identify each word within a given sentence. Tokenization involves classifying strings of characters into text tokens. For example, a sentence structured as, "the car drives on the road," may be represented in XML as:

```
<sentence>
  <word> the </word>
  <word> car </word>
```

6

-continued

```
  <word> drives </word>
  <word> on </word>
  <word> the </word>
  <word> road </word>
</sentence>.
```

In some embodiments, tokenization process 210 may access one or more gazetteers, which store lists of predefined words and phrases from capturing specific concepts, such as domain-specific concepts. Some example gazetteers may include lists of person names, locations, and objects. Another example gazetteer may include a list of acronyms or abbreviations, and expansions/definitions of the acronyms or abbreviations (such as {"FDA", "Food and Drug administration"}). In some embodiments, multiple gazetteers may be accessed, where each gazetteer is specifically crafted to include terms related to clinical trial knowledge extraction. Some example domains include, but are not limited to, the Life Sciences domain, the Computer System Validation domain, the Clinical Trials domain, the Drug Development domain, the Software as a Medical Device domain, the Quality & Risk assessments domain, or other domains.

In some embodiments, tokenization process 210 may analyze a particular type or types of documents. Parsing subsystem 110 may be configured to analyze metadata associated with a given document to identify a document type, a security level of the document, whether the document is encrypted, or other information about the document. For example, tokenization process 210 may detect a document type of a given document and determine whether parsing subsystem 110 is capable of analyzing the given document based on the document type.

NER process 212 refers to a process of associated a text token with a pre-classified entity (such as a named entity) such that a given token has a meaning identifiable to computing system 102. A downstream process called named entity resolution (ER) 214 may be configured to link a given text token to a specific known entity. For example, the text token "Atlanta" may be resolved to the named entity "Atlanta" corresponding to the city in Georgia, whereas the text token refers to a string of alphanumeric characters with no computer-processed meaning. NER process 212 and entity resolution 214 processing may utilize gazetteer information, such as for matching text results with different entities (such as titles, names, places, etc.). Such NLP entity extraction models may include the General Architecture for Text Engineering (GATE), OpenNLP, or other entity recognition models.

A gazetteer may include its own list of terms (for example, words, phrases, symbols, etc.) related to an overall theme of that gazetteer. For example, the gazetteer "Pharmaceuticals" may include a list or lists of various pharmaceutical medications. Thus, entity extraction may identify whether prose recites any of the listed pharmaceutical medications based on an analysis of the text tokens from a given document in comparison to tokens included in the "Pharmaceuticals" gazetteer. By adding these customized and subject matter-specific gazetteers to traditional gazetteers, entity extraction is able to extract more intelligence from a document than conventional entity extraction systems. In addition, the gazetteers may be scaled to include new lists of terms to expand the entity identification capabilities of computing system 102. Still further, the gazetteers may be modified (for example, new terms may be added to an existing gazetteer, existing terms may be removed, etc.).

Parsing subsystem 110 may further perform operations such as sentence splitting may recognize sentence boundaries, with ability to differentiate punctuation used for other purposes (for example, decimal points, abbreviations.). In some embodiments, additional document structure indicators, such as paragraph, section, or other delimiters, may be identified. Additionally, stop word removal (for example, removing stop words such as "the," "in," "a," and "an") and/or stemming (for example, reducing a word to its stem or root) may be performed. Still further, part-of-speech tagging may be performed whereby sentences are parsed and associated with a part of speech. POS tagging involves tagging each text token with a tag indicating a part of speech that the token corresponds to. For example, POS tagging may include tagging each text token with a tag indicating whether the text token represents a noun, a verb, an adjective, etc.

Still further, parsing subsystem 110 may be configured to derive knowledge from the extracted value (for example, information derived by performing operations to the extracted data). In some embodiments, semantic analysis operations may be performed to identify semantic and/or contextual information regarding a given document. Some embodiments implement natural language modeling techniques to identify symbols. Semantic analysis techniques may also be used to categorize the extracted content and derive second-order features/knowledge from the extracted content.

In some embodiments, parsing subsystem 110 may further be configured to generate word embeddings for the text tokens. Word embeddings refer to learned representations of individual words or terms that are processable by computing system 102. Machine learning models, and in particular natural language processing models, may be used to generate word embeddings for text tokens. The machine learning models may be stored in model database 178 and may be retrieved by computing system 102 to generate the word embeddings. Some example machine learning models stored in model database 178 that may be used to generate word embeddings, include, but are not limited to, (which is not to imply that other lists are limiting), Word2Vec, Continuous Bag-of-Words (CBOW) model, Continuous Skip-Gram Model, Global Vectors for Word Representations (GloVe) model, Latent Semantic Analysis (LSA), BERT, or other machine learning models. The machine learning model may generate a vector representation (such as a feature vector) of a given text token based on the resolved entity, the POS, other text tokens in the sentence, other text tokens in the section, or other information. Each feature vector may be n-dimensions in size, where each dimension refers to a feature of the word. The number of dimensions of the feature vector may be defined by the machine learning model, such as based on a number of domain-specific entities included within entity taxonomy 220. Entity taxonomy 220 may store listings of entities, which are also referred to herein interchangeably as domain-specific entities, as each list of entities may be associated with a particular domain or domains. In some embodiments, the number of dimensions of the feature vector may depend on a given domain with which the document is determined to relate. For example, if a given document is determined to relate to a first domain, where entity taxonomy 220 stores N entities specific to the first domain, then a feature vector generated to represent the document may include N-dimensions, each related to a respective entity. For instance, a feature space for the feature vectors generated by the machine learning model may include 50 or more dimensions, 100 or more dimensions, 1,000 or more dimensions, or more.

The documents analyzed by parsing subsystem 110 may include documents generated from voice interactions between a user and their client device, computing system 102, or other components of system 100. For example, client device 104 may be a smartphone including a microphone or other audio capturing device. Some embodiments include an individual invoking a physical button, a GUI, or uttering a keyword or key phrase to cause the microphone to capture a spoken utterance. Audio data representing the utterance may transformed into text data, from which natural language processing techniques can be performed to determine an intent of the utterance, an action to be performed, or other actions. For example, based on the text data (representing the audio data, which represents the utterance), the text can be analyzed using the steps associated with parsing subsystem 110, such as tokenization, NER, entity resolution, or other NLP actions. Examples of voice interactions may include output from and/or input to a device such as the client device, computing system 102, and/or other components of system 100. For example, the device may output information via audio, such as a voiceover message that provides a welcome prompt, a prompt to select a module to perform various system functions, and/or other information conveyed by the device via audio. In other examples, the device may receive inputs such as utterances and transform the utterance into text that corresponds to user request. For example, the input may include user utterances that indicate a selection of a particular system for the audit, input for scheduling functions, input for user intervention on system-generated findings, reporting, publishing, and/or other system functions with which users may interact or otherwise invoke.

Figure 3:
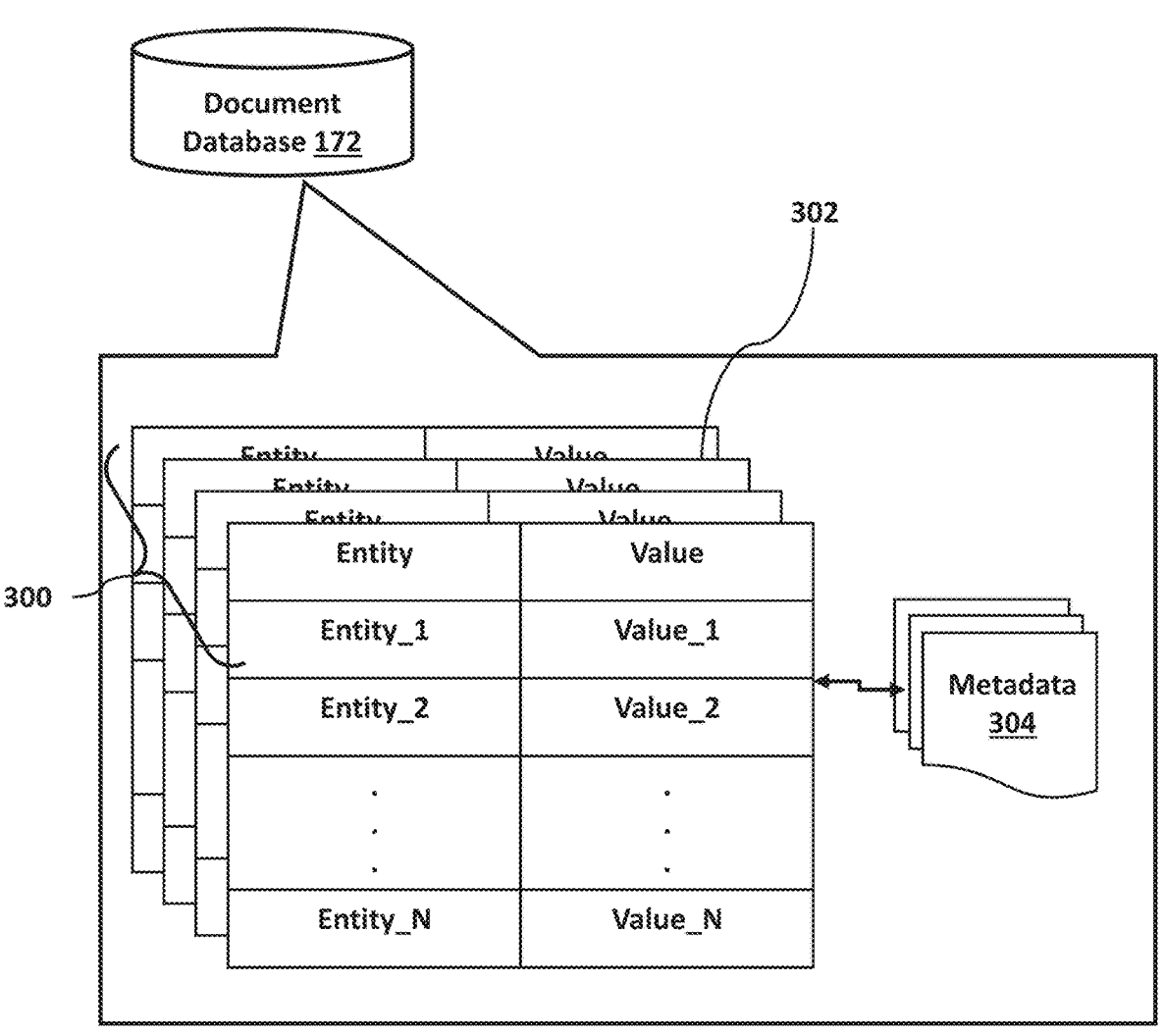
FIG. 3 is a diagram of a document database storing documents, in accordance with various embodiments.

In some embodiments, data structure generator 216 may be configured to generate a data structure representing an analyzed document. For example, the data structure may include the plurality of domain-specific entities and the entity values associated therewith. As an example, with reference to FIG. 3, document database 172 may be configured to store data structures 300 storing domain-specific entities and the values associated therewith for a particular document (or set of documents). For example, a data structure 302 of data structures 300 may include a list of domain-specific entities (such as Entity_1, Entity_2, . . . , Entity_N) and values associated with each domain-specific entity from the list (such as Value_1, Value_2, . . . , Value_N). In some embodiments, the value stored in association with a domain-specific entity may be "Null" or undefined. This may indicate that no particular value could be resolved to a corresponding entity. A null value may be present if a particular entity is not detected within the unstructured text of a document. In some embodiments, data structures 300 may be stored in association with metadata 304. The metadata associated with a particular data structure, such as data structure 302, may indicate a document and/or document identifier associated with that data structure. Metadata 304 may further indicate a feature vector and/or word embedding associated with a data structure's corresponding analyzed document.

In some embodiments, parsing subsystem 110 may be configured to perform new entity processing 218. New entities may be manually added, in some cases. For example, a user may add a new entity to entity taxonomy 220. The new entity may also include an indication of a domain with which the entity relates. In some embodiments, new entity processing 218 may further include deriving new entities from analyzed text. For example, subsequent to analyzing a document using natural language understanding processes (such as named entity recognition, entity resolution, etc.) to identify a frequency with which a given term is recited within a given document or across documents. In some embodiments, each term encountered during the tokenization process may be logged, and a counter for how many occurrences of that term exist across analyzed documents may be incremented. Every additional occurrence of a particular term may cause the counter to be incremented again. If a particular term is not recognized as a named entity, then this term may be considered to be a candidate new entity. If the number of occurrences for a candidate new entity is determined to equal or exceed a threshold number of occurrences (such as 20 or more occurrences, 50 or more occurrences, 100 or more occurrences, etc.), then this may indicate that the term should be added to entity taxonomy 220 as a new entity. Furthermore, some embodiments include storing the tokens associated with the new entity. The stored tokens may then be analyzed to determine expected values for the new entity. When the new entity is detected within the unstructured text of a newly accessed document, a determination may be made as to whether the value associated with the new entity is the same or similar to any of the expected values for the new entity. This determination may be used as a basis for evaluating a given domain-specific rule.

Figure 4:
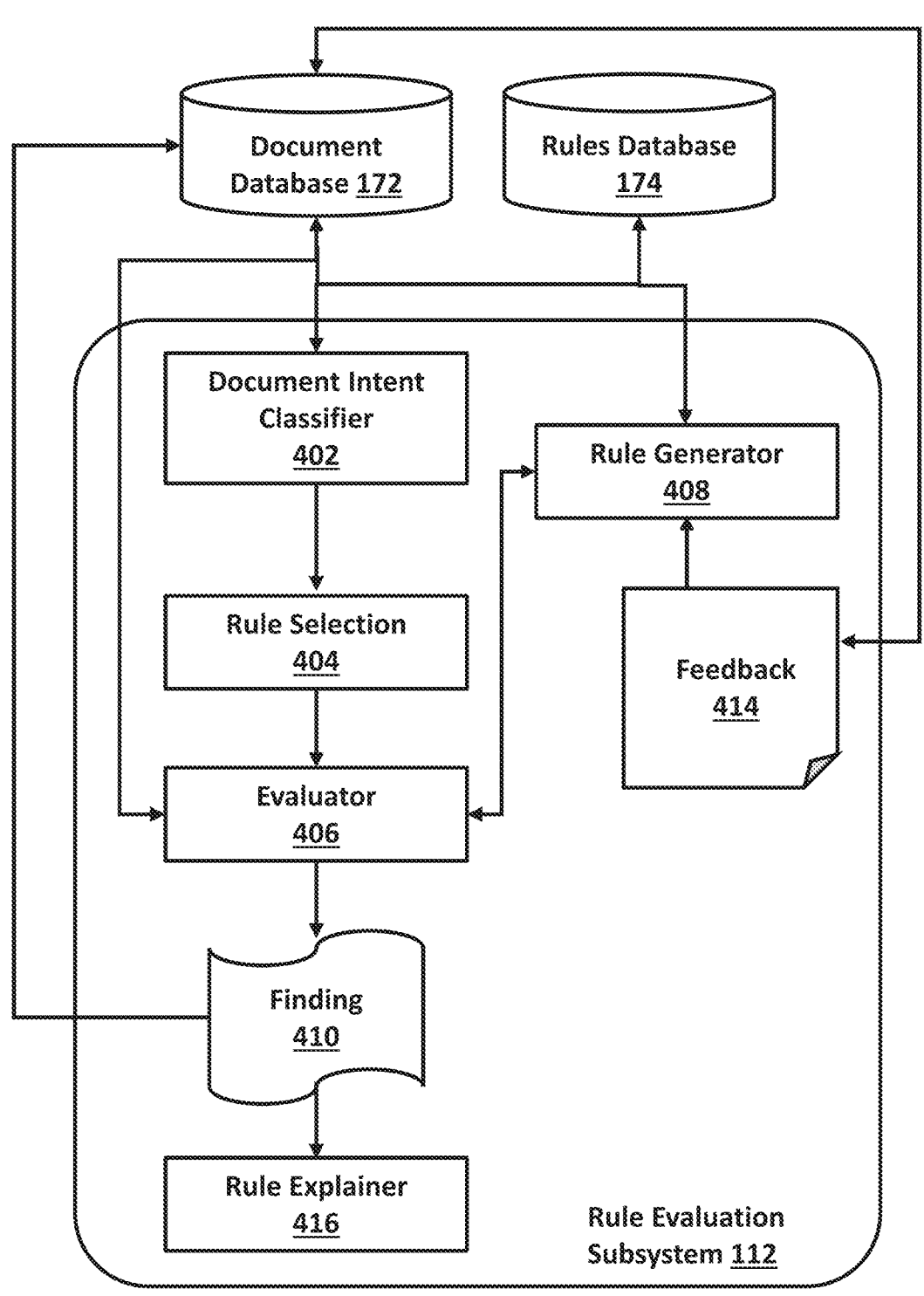
FIG. 4 is a diagram of a rule evaluation subsystem used to evaluate domain-specific rules against documents, in accordance with various embodiments.

In some embodiments, rule evaluation subsystem 112 may be configured to evaluate rules against one or more documents to obtain findings. The rules may also be referred to interchangeably as "domain-specific rules" as these rules may be selected for evaluation may be specific to a domain with which a document to be analyzed relates. For example, with reference to FIG. 4, rule evaluation subsystem 112 may include a document intent classifier 402. In some embodiments, document intent classifier 402 is a natural language understanding model configured to determine one or more topics with which a given document relates. As an example, if a document includes unstructured text describing a professional baseball player, document intent classifier 402 may classify the document as relating to the topic "baseball." In some embodiments, a topic classifier may determine a topic or topics with which a document relates by analyzing the named entities recognized as being within the text and the values resolved to those named entities. Certain entities may be pre-classified as relating to a particular topic. Based on which entities values are resolved to, the classifier may determine which topic the document relates. For example, if a predefined number of occurrences of a particular keyword defining a first entity is included within the unstructured text of a document, this may indicate that the document relates to a first topic. In some embodiments, a feature vector may be generated by document intent classifier 402, where the feature vector describes a location in a feature space defined by the number of topics to which a document may be classified. As an example, a document that may be classified into 10 or fewer topics may produce a feature vector in a 10-dimensional feature space. Therefore, the location in the feature space defined by the feature vector represents a likelihood that the document relates to a particular topic. The feature vector, topics, or other information, may be stored in association with the corresponding document via document database 172. For example, document database 172 may store data structures representing the feature vector generated for the document, where the feature vector and the document may be associated within document database 172.

In some embodiments, keywords may be detected within text of a document using a keyword spotting model, a convolutional neural network, or other machine learning models, or combinations thereof. Some or all of the text of a document (for example, unstructured text data of a document) to determine whether the text includes any terms included in a predefined list of events or event types.

In some embodiments, the topic may represent the domain with which the document relates. Thus, based on the identified topic, the domain with which to select domain-specific rules may be determined. For instance, rule selection 404 may identify the topic that the document has been classified to and may select a set of rules specific to a domain with which the topic relates. In some embodiments, if a particular document is determined to relate to multiple topics, then the rules selected may include rules related to some or all of the domains related to the multiple topics. The rules, in some cases, may be pruned to remove duplicate/redundant rules. In some embodiments, each rule may include a rule identifier that identifies the particular rule. To evaluate the rules against a document, a script may be executed that includes an indication of the rule identifiers for all of the rules to be applied to the document. The selected set of domain-specific rules may therefore result in population of the script with rule identifiers. In some cases, the rule identifiers may include an indication of a network identifier of the rule indicating a location within rules database 174 where that rule is stored. Therefore, when the script is executed, the script instructs computing system 102 to locate the rule within rules database 174 for executing the rule against the document.

Figure 5A:
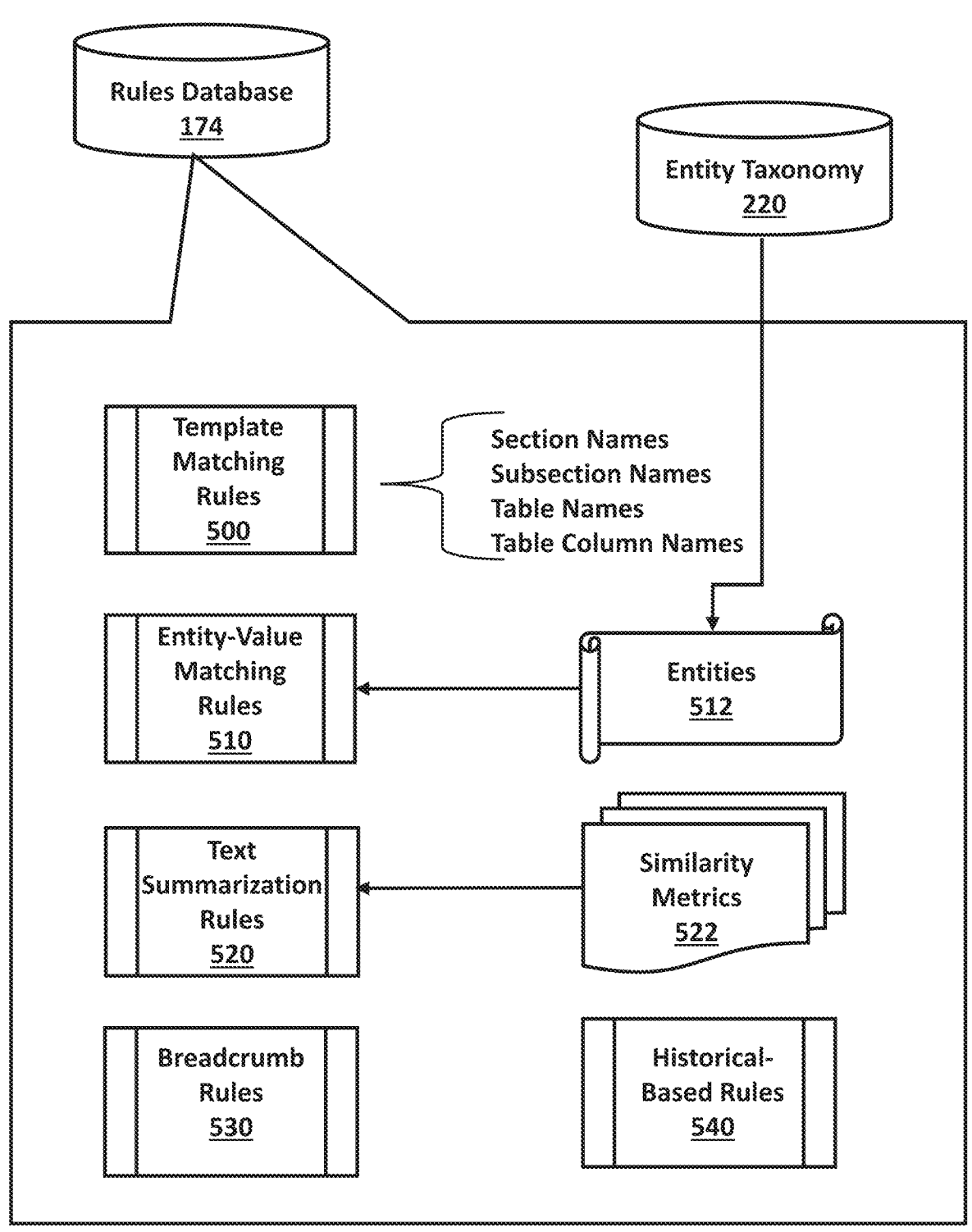
FIG. 5A is a diagram of a rules database storing rules to be used for evaluating documents, in accordance with various embodiments.

In some embodiments, evaluator 406 may be configured to execute the evaluation of the set of domain-specific rules against the document. The set of domain-specific rules may be stored and/or access via rules database 174. As an example, with reference to FIG. 5A, rules database 174 may include template matching rules 500, entity-value matching rules 510, text summarization rules 520, breadcrumb rules 530, historical-based rules 540, or other rules.

Template Matching: Template matching rules 500 represent rules configured to determine whether a given document has a structure that is the same or similar to a template structure. In some embodiments, template matching rules 500 may be domain-specific. For instance, the template structure used to compare the given document's structure to may depend on the domain with which the document corresponds. If the document relates to a first domain, then the template structure may be a first template structure representing an expected structure of a document relating to the first domain. In some embodiments, template matching rules 500 may determine a similarity score indicating how similar a structure of text of a document is to a template structure. An example template structure is: Section Names; Subsection Names; Table Names; Column Names. If the computed similarity score satisfies a threshold condition, such as where the threshold condition is satisfied if the computed similarity score is equal to or greater than a threshold similarity score, then that document may be classified as valid against the evaluation of the template matching rule. The similarity score may be computed by determining whether the structure of the text of the document is the same or similar to the example template structure. For instance, a structure of Section Name; Subsection Names; Table Names; Column Names may yield a greater similarity score with respect to the template structure than a structure of Subsection Names; Table Names; Column Names. FIG. 5B includes an example of pseudocode 550 representing a template matching rule performed against a document (such as SRD-0004646v1.0.dox) to determine whether the document complies with the template structure matching requirement of that rule.

Some embodiments include template matching rules 500 including rules that identify sentences in a document that similar to one or more previously analyzed documents. An NLP similarity recognition model that uses information retrieval techniques to extract information from the documents text, a vector space model, a latent semantic analysis, or other information extraction processes may be used to determine the similarity between text. The vector space model may represent documents as vectors of terms, and may identify similar documents, similar portions of documents (for example, similar sections, sentences, paragraphs, etc.), by computing a similarity metric, such as a cosine similarity. In some embodiments, the vector space model may retrieve (or construct) a feature vector for a document's text tokens, strings of text tokens (for example, sentences, paragraphs), or the document's entire text, or other subsections of the document's text. For example, if a given sentence includes ten text tokens, which may correspond to a 10-word sentence, the vector space module may compute a similarity score for the text tokens. The similarity may be with respect to other strings of text tokens in the document, or to other strings of text tokens found in other documents. In some embodiments, the similarity score, which is also referred to herein interchangeably as a similarity metric, refers to a distance between two feature vectors in a feature space formed based on the dimensionality of the text token feature vectors. In some embodiments, the distance between two feature vectors, refers to a Euclidian distance, an L2 distance, a cosine distance, a Minkowski distance, a Hamming distance, or any other vector space distance measure, or a combination thereof.

In some embodiments, semantically related words or phrases may be identified using various natural language processes such as Latent Semantic Analysis (LSA) or Word2Vec. Latent semantic analysis (LSA) and/or latent semantic indexing may be used to determine documents having similar text. Additionally techniques for identifying topically or otherwise semantically related terms or phrases include Latent Dirichlet Allocation (LDA), Spatial Latent Dirichlet Allocation (SLDA), independent component analysis, probabilistic latent semantic indexing, non-negative matrix factorization, and Gamma-Poisson distribution. Both of the LSA and vector space model, as well as other semantic analysis techniques, are based on a reduced dimensional representation of documents, which may be used to rank candidate text paragraphs and return the best match.

In some embodiments, each domain-specific rule defines a domain-specific requirement that a document is expected to meet. A document that complies with the rule may be deemed "valid" whereas a document that fails to comply with the rule may be deemed invalid. In the template matching rule example, a document having a structure that is the same or similar to a template structure may produce a finding that the document complies with the template matching rule. Some embodiments include determining whether a structure of a document satisfies the requirements of a template matching rule using fuzzy matching. Fuzzy matching may include determining whether a given text string approximately matches a predefined text string. In some embodiments, an entity may have multiple valid values, and therefore template matching rules 500 may include a determination of whether a given value extracted from the unstructured text matches any values stored as being valid for a particular entity. In some embodiments, a partial template matching is performed. The partial template matching may include verifying that some of the sections, subsections, tables, column names, etc. satisfy a given rule.

In some embodiments, tabular matching may be performed in which subsections of a template are parse. For example, tabular matching may include parsing tubular columns such as header names and corresponding contents within a given table of unstructured text. In particular, template matching may identify content, sections, subsections, or other portions of unstructured text and tabular matching may identify particular columns of tabular structures within the content, sections, subsections, or other portions of unstructured text. Entity-Value Matching: Entity-value matching rules 510 may include rules defining requirements that a particular entity or set of entities are represented by a document, have values resolvable to those entities, have valid values for those entities, or other rules related to the entities included within a document's prose. In some embodiments, entity-value matching rules 510 may include a predefined list or lists of entities 512 curated from entity taxonomy 220. Entities 512 may include entities that are expected to be recognized within unstructured text (such as after tokenization) and/or entities with which values are expected to be assigned. For example, for a document determined to be related to a first domain, entities 512 may include a set of entities expected to be within all documents related to the first domain. In some embodiments, entities 512 may also include an indication of where some or all of entities 512 are expected to be included within the unstructured text of a document. For example, entities such as "Title" or "Author" may be expected to be located towards a beginning of a journal article, whereas an entity "Result" may be expected to be located towards an end of the article.

As an example, with reference to FIG. 5C, pseudocode 560 may represent an entity-value matching rule whereby a determination is made (i) whether a particular document (such as source "SME") includes entities 512, as well as (ii) whether values attributed to those entities (such as via entity resolution processing) are included within a list of valid values for a particular entity. For instance, as seen in pseudocode 560, the rule may indicate that an entity "business criticality" is expected to be included within the prose of a document being analyzed by computing system 102. Furthermore, if the entity "business criticality" is detected within the prose of the document, a value associated with that entity should be one of the following acceptable values: "high", "medium", "low", "moderate", "performed". If the value resolved to the entity is one of those acceptable values, then a requirement of the rule being applied to the document may be considered met. If not, then the requirement of the rule may be considered as not met. In some embodiments, the entity-value matching rules may include fuzzy matching whereby a predefined threshold amount of a text string is needed to match to a detected text string to classify as being a match.

Text Summarization: Text summarization rules 520 may include rules for verifying that the unstructured text of a document describes a same or similar topics as that of a corpus of previously analyzed documents. For each of the previously analyzed documents, a topic or topics determined to be described thereby may be stored in association with the document (such as an n-dimensional feature vector, where n corresponds to a number of topics in the ontology). In some embodiments, a document may be evaluated to determine whether that document describes content related to one or more topics. To determine whether the document describes the same content, a first similarity metric, a second similarity metric, or other similarity metrics of similarity metrics 522 may be evaluated against the document. The first similarity metric may compute how similar one document is to another document based on a summarization model. The summarization model may be configured to take, as input, the raw text data of a document, and may output a summarization of some or all of the document. In some embodiments, the summarization may be represented using a feature vector including n-dimensions, each corresponding to how similar the document is to a particular topic of a topic ontology. The first similarity metric may therefore output a first similarity score representing how similar the summary of the document is to the summary of a previously analyzed document or documents. The second similarity metric may compute how similar the keywords detected within the document are to the keywords detected in one or more of the previously analyzed documents. For example, a data structure may be generated for each previously analyzed document that stores an indication of each keyword (such as entity) detected within a respective document and/or a frequency with which that keyword was detected within the respective document, within a subset of previously analyzed documents, within an N-most recently analyzed documents, and the like. The second similarity metric may therefore output a second similarity score representing how similar the keywords of the document are to the keywords of a previously analyzed document or documents.

In some embodiments, text summarization rules 520 may include a rule whereby, for a given document to meet the requirements of the rule, the first similarity score computed for the given document is to be less than or equal to the second similarity score computed for the given document. If the first similarity score is less than or equal to the second similarity score, then the given document may be classified as satisfying some or all of text summarization rules 520. However, if the first similarity score is not less than or equal to the second similarity, then the given document may be classified as not satisfying some or all of text summarization rules 520.

Breadcrumbs: Breadcrumb rules 530 may include rules detecting a hierarchical and/or historical organization of a document. For example, in the case of a web site whereby user purchases an item, the user may, via their client device 104 leave a trail of which pages within the site they visited during the session with the web site's server. These breadcrumbs may include a shopping cart page whereby an item was stored for purchase, a billing page whereby payment information for purchasing the item was provided, a shipping page whereby shipping information for delivery of the purchased item was provided, and a payment page whereby notification of the payments success or failure is provided to the user. Some examples of domain-specific breadcrumb rules may include determining whether a particular document has a top level section, a subsection, a sub-subsection, a table, etc. In some embodiments, the breadcrumb trial may be used to determine whether a duplicate entity (such as "Name") is present.

Historical-Based: Historical-based rules 540 may include rules configured to detect patterns indicative of a rule or rules describing how a document is expected to be formed. Historical-based rules 540 may access one or more models stored in model database 178 to detect grammatical structures in previously accessed documents (such as stored in document database 172), identify entities, as well as values associated with those entities, described by the text of the document. In some embodiments, one or more of the models (such as a natural language model) may be configured to identify a prescribed action that is to be taken for a document, a rule, or another action performed to another object responsive to the detected grammatical structures and/or named entity-value pairs. In some embodiments, historical-based rules 540 may be generated and/or analyzed via rule generator 408 of FIG. 4. For instance, historical-based rules 540 may be used as a basis for generating/deriving new rules to be added to a set of rules associated with a particular domain. For example, based on the identified actions and/or grammatical structure, a rule governing what is expected to happen to the document, or to another document, in response to detecting particular grammatical structures and/or entities/entity-value pairs, may be generated. For example, in response to detecting the entity "Medical Term" having a value "Myocardial Infarction," it may be determined that the corresponding document should be transmitted to an urgent scheduling system. The generated rules may be referred to as candidate rules. These candidate rules may be applied across a set of training documents and/or accessed documents for verifying the accuracy and/or effectiveness of the rule.

In some embodiments, rule generator 408 may accept feedback 414 for generating, updating, or modifying one or more domain-specific rules. Feedback 414 may indicate whether a corresponding finding was determined to be accepted, or if the corresponding rule is to be updated. Feedback 414 may be used to determine whether a give rule is to be updated or removed or maintained.

Returning to FIG. 4, evaluator 406 may output findings 410 of a respective evaluation of a set of domain-specific rules against a document. The findings may indicate whether a respective domain-specific requirement of the domain-specific rule has been met by the document. For example, finding 410 may indicate whether a first document met the respective requirements of rules 500-540. In some embodiments, findings 410 may be stored in association with a corresponding document within document database 172. For example, a first document may produce a first finding or first set of findings responsive to being evaluated against rules 500-540. The first finding may indicate whether the document met the requirement of a particular rule or met the requirements of a particular set of rules.

Figure 6:
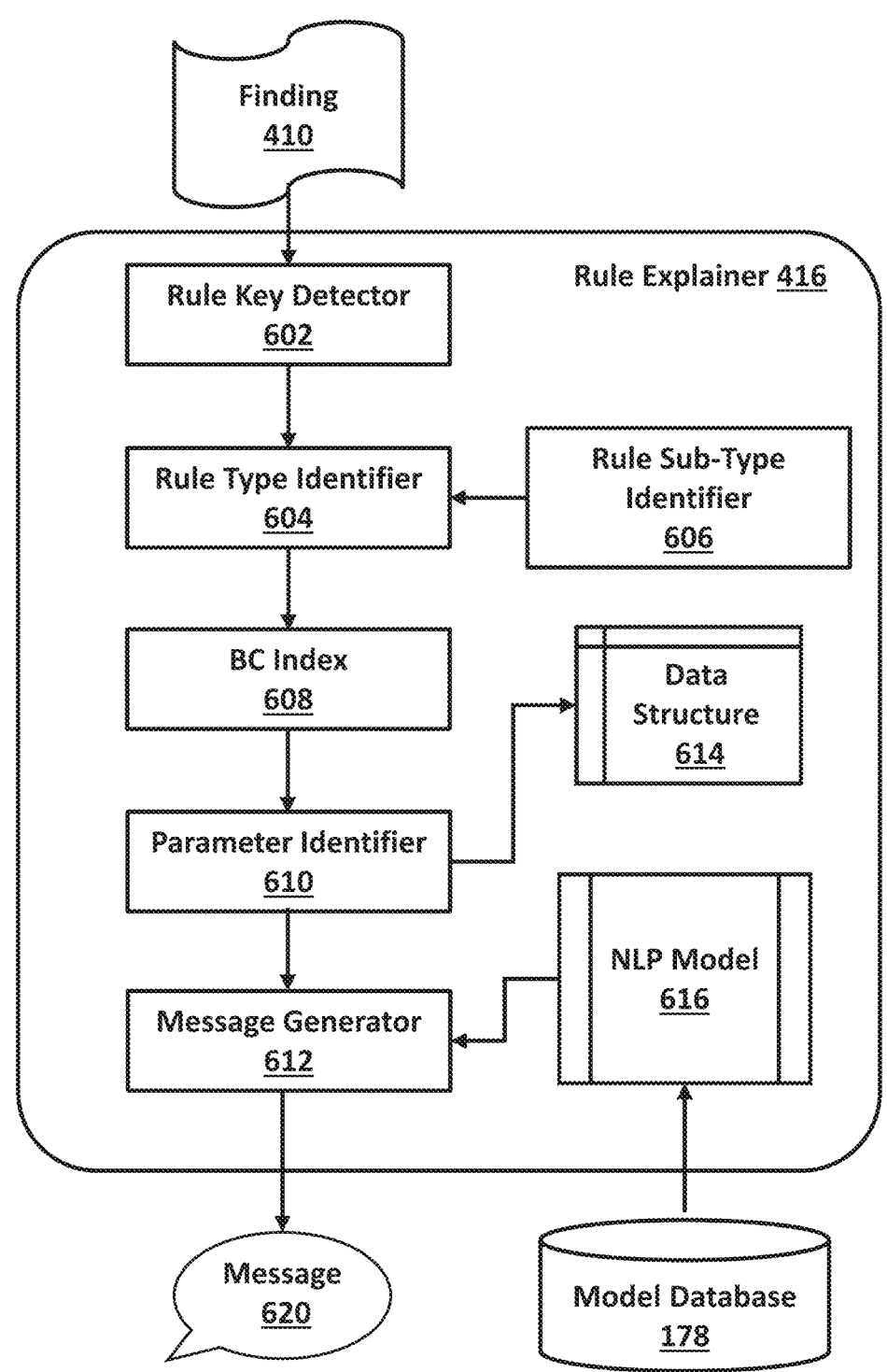
FIG. 6 is a diagram of a rule explainer used to identify results from the evaluation of the domain-specific rules against the documents, in accordance with various embodiments.

Findings, such as findings 410, may also be provided to a rule explainer 416. Rule explainer may be configured to translate the findings (such as a config file) into a humanlike narrative, generate graphical user interface data for rendering of a web interface deployable to client device 104, or perform other tasks. As an example, with reference to FIG. 6, rule explainer 416 may represent a system configured to detect one or more parameters within findings 410 for a particular document. Some embodiments include rule explainer 416 being configured to perform a process 602 of detecting a rule key or rule identifier of an evaluated rule, a process 604 of identifying a rule type of the evaluated rule, a process 606 of identifying, if available a rule sub-type of the evaluated rule, a process 608 of determining a BC index for the rule, a process 610 of identifying a parameter and/or parameter type of the evaluated rule, and/or a process of generating a brief message and/or a detailed message regarding the finding. In some embodiments, processes 602-610 may produce a data structure 614 populated with data from findings 410. An example of data structure 614 is listed below as Table 1:

TABLE 1

| Rule_ key | Rule_ type | Rule_ subtype | BC_ index | Brief Message | Detailed Message | Params | Param_ Type |
|---|---|---|---|---|---|---|---|
| Rule_0 | Template Matching | Verify column names | Signature Page, Author | There should be a table. | In Signature Page, Author, there should be a table. Allowed column names are "Full Name"; "Title/ Department". | Full Name; Title/ Department | LIST OF LISTS |
| Rule_0 | Template Matching | Verify section names | Signature Page, Reviewed by | There should be a section "Reviewed by". | In Signature Page, there should be a section "Reviewed by." Allowed section names are "Reviewed by". | Reviewed by | LIST |
| Rule_16 | Tabular Extraction | Verify column values | column | There should be a Full Name column | There should be a Full Name column. Allowed column values are: "Name_1", "Name_2". | "Name_1", "Name_2". | UN-ORDERED LIST |

The rule key refers to an identifier, or key, of a particular rule that is used to evaluate a document. For example, "Rule_0" may represent an identifier of a particular rule. The rule type refers to a type of rule that the corresponding identifier represents. Continuing the example, Rule_0 may refer to a "Template Matching" rule (such as one of template matching rules 500). The rule subtype refers to a subtype of a corresponding rule. For instance, Rule_0 may refer to a subtype of rule under the rule type "Template Matching", such as "Verify Column Names". Params or parameters refers to parameters associated with the rule. For example, the parameters associated with Rule_0 may include "Full Name" and "Title/Department". The type of parameters included by the parameters may represent what the different kinds of parameters are. In the example above, the parameters "Full Name" and "Title/Department" may be of the type "List of Lists".

Figure 7A:
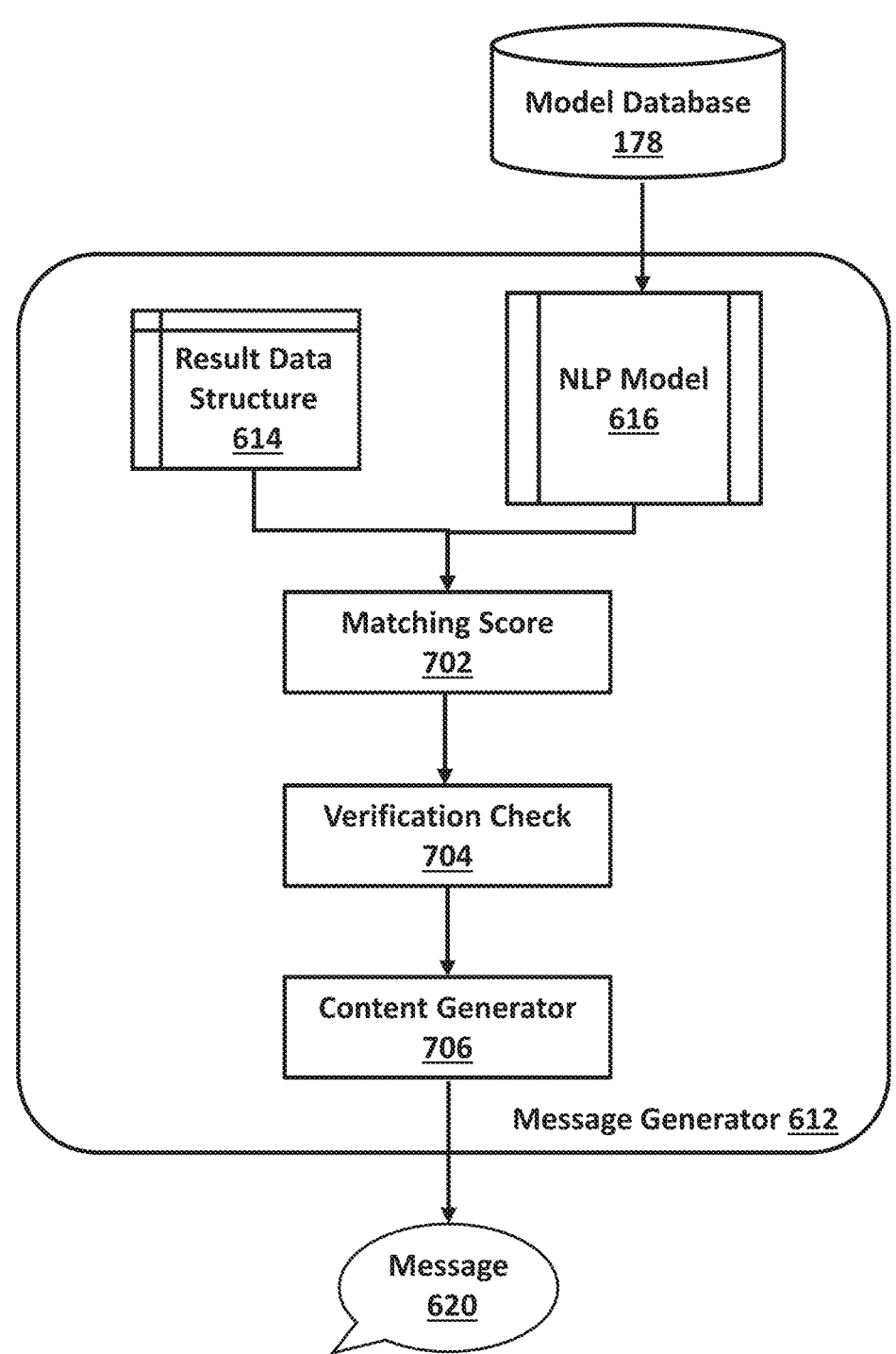
FIG. 7A is a diagram of message generator used to generate messages describing the identified results, in accordance with various embodiments.

Message generator 612 may be configured to generate a message or messages based on data structure 614. As an example, with respect to FIG. 7A, message generator 612 may performing score matching 702, verification checks 704, content generator 706, or other components. In some embodiments, score matching 702 may determine whether a particular finding (such as finding 410) may generate a matching score indicating whether what was expected to be found was what was actually found during the evaluation. The matching score may be used to classify a particular finding as being positive or negative. For instance, verification check 704 may obtain the computed matching score and may output a result indicating whether the finding was found to be positive or negative. As an example, a matching score of "0" may be classified as "negative," indicating that the particular finding was found to violate the requirement of a particular rule evaluated against a document (such as where the document produces data structure 614).

In some embodiments, content generator 706 may generate message 620, where message 620 may be a first message and a second message. The first message may be a "brief" message and the second message may be a "detailed" message. Message generator 612 may access NLP model 616 stored in model database 178 to generate the first and/or second message(s). Some embodiments, as described below, include training NLP model 616 to generate messages—brief and/or detailed—based on a training data including previously analyzed documents, also referred to herein interchangeably as "training documents," and subsequently generated messages from the respective findings of those training documents. For example, a model may be trained using training documents and their respective data structures generated via processes 602-610, as well as, in some cases, the document analyzed to produce findings 410. The brief messages may indicate a short, compact message in natural language text. In some embodiments, the brief message may include major faults found during the evaluation process. For example, as seen in Table 1, the brief message may recite "There should be a title" based on data structure 614 indicating that no title was detected when evaluating a document against rules 500-540. In some embodiments, the detailed message may indicate granular faults in the evaluation process. For example, the detailed message may indicate, based on data structure 614, that within the "Signature/ Author" portion of the document, there should be a table, and that table should be populated with values matching the parameters allowed. An example message 620 is depicted by FIG. 7B.

Figure 8:
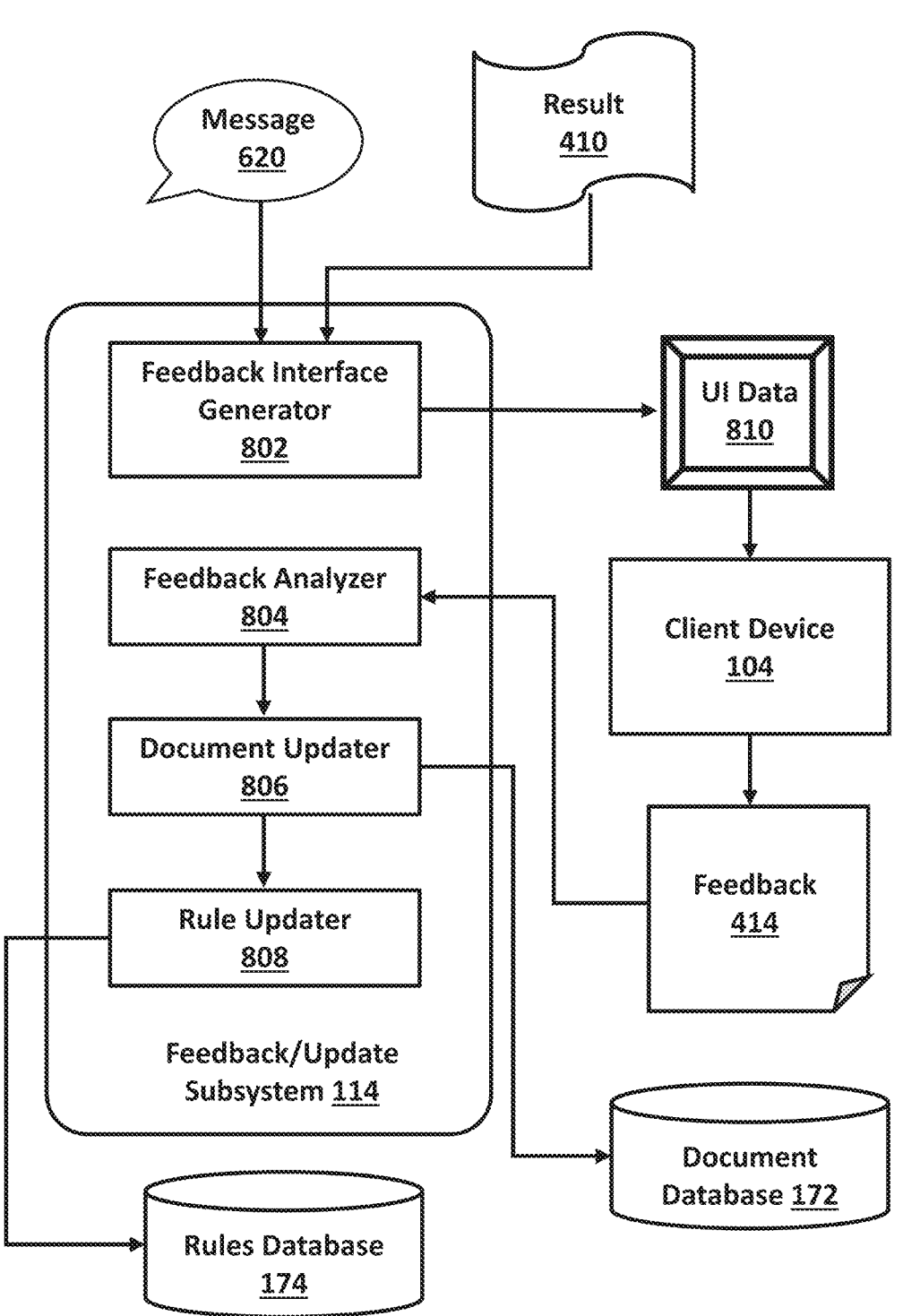
FIG. 8 is a diagram of a feedback/update subsystem used to analyze feedback with respect to, and determine whether one or more domain-specific rules are to updated based on, findings from an evaluations of domain-specific rules against documents, in accordance with various embodiments.
Figure 9A:
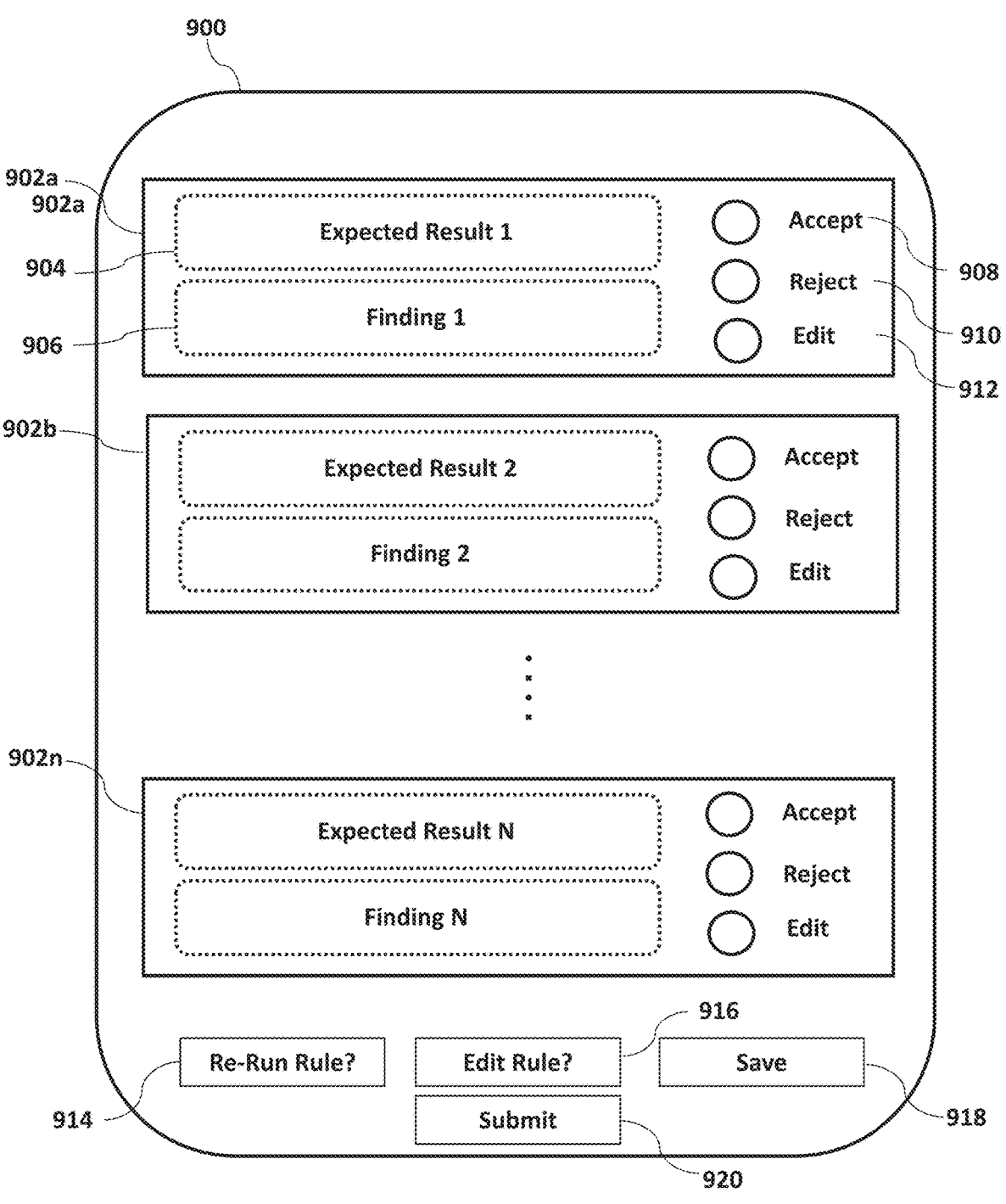
FIGS. 9A and 9B are diagrams of graphical user interface capable of being rendered on a display of a client device for obtaining feedback with respect to the findings of an evaluation of domain-specific rules against documents, in accordance with various embodiments.

Returning to FIG. 1, feedback/update subsystem 114 may be configured to generate a user interface or other feedback mechanism with which feedback may be provided regarding a particular finding and/or message describing the finding. As an example, with reference to FIG. 8, feedback/update subsystem 114 may include a feedback interface generator 802. Feedback interface generator 802 may be configured to generate user interface (UI) data 810. UI data 810 may be provided to client device 104 to display a user interface thereon. As an example, with reference to FIG. 9A, an example user interface 900 may include section 902a, section 902*b*, . . . , section 902*n,* each of which relates to a particular domain-specific rule that was evaluated against a document. For example, section 902*a* may relate to a first domain-specific rule evaluated against a document. Each section may include an indication of an expected result 904 associated with corresponding domain-specific rule, as well as an actual result 906 associated with the finding (such as finding 410) obtained by evaluating the domain-specific rule against the document. In some embodiments, each section may also include selectable options 908, option 910, option 912. Selection of one of options 908-912 may indicate whether the findings should be accepted, rejected, or edited, respectively. Feedback 414 may include an indication of whether a particular finding was accepted, rejected, or edited. User interface 900 may also include options to re-evaluate a rule against a document 914, edit a particular rule 916, save finding, feedback, or other information, for each rule's evaluation to memory 918 (such as stored within document database 172 in association with a corresponding evaluated document), submit the findings, feedbacks 920.

Returning to FIG. 8, responsive to obtaining feedback 414, feedback analyzer 804 may review the feedback to derive information about the accuracy of the evaluations performed for a given document. Feedback analyzer 804 may be configured to analyze feedback 414 using natural language models, such as NLP model 616 stored in model database 178. Feedback analyzer 804 may take an input of prose from feedback 414, features derived from feedback 414, or other information. Feedback analyzer 804 may indicate whether the findings of the evaluations were determined to be accurate. In some embodiments, feedback analyzer 804 may further indicate whether a document and/or rule should be updated. When a document is determined to be updated, the update to the document may be provided to and stored by document database 172.

Document updater 806 may cause some or all of a document to be updated. This may include updating a document to include derived knowledge. For example, users may be manually revise the automatically generated document such as to revise one or more values, remove one or more values, or otherwise modify the document. In some of these examples, the user may identify domain-specific rules are correct (should continue to be used) or incorrect (should be removed or revised). In some examples, the user may flag a domain-specific rule for further evaluation. In these examples, the feedback analyzer 804 may store the domain-specific rule in association with an indication that the domain-specific rule is to be further evaluated. Periodically or on-demand, domain-specific rules to be further evaluated may be presented to a user or group of users (such as an audit committee) that may determine or vote on the appropriateness of the rule. In some examples, the user or group of users may vote to retain unchanged, remove, or modify the domain-specific rule. The result of such decision may be stored in the rules database 174.

Figure 9B:
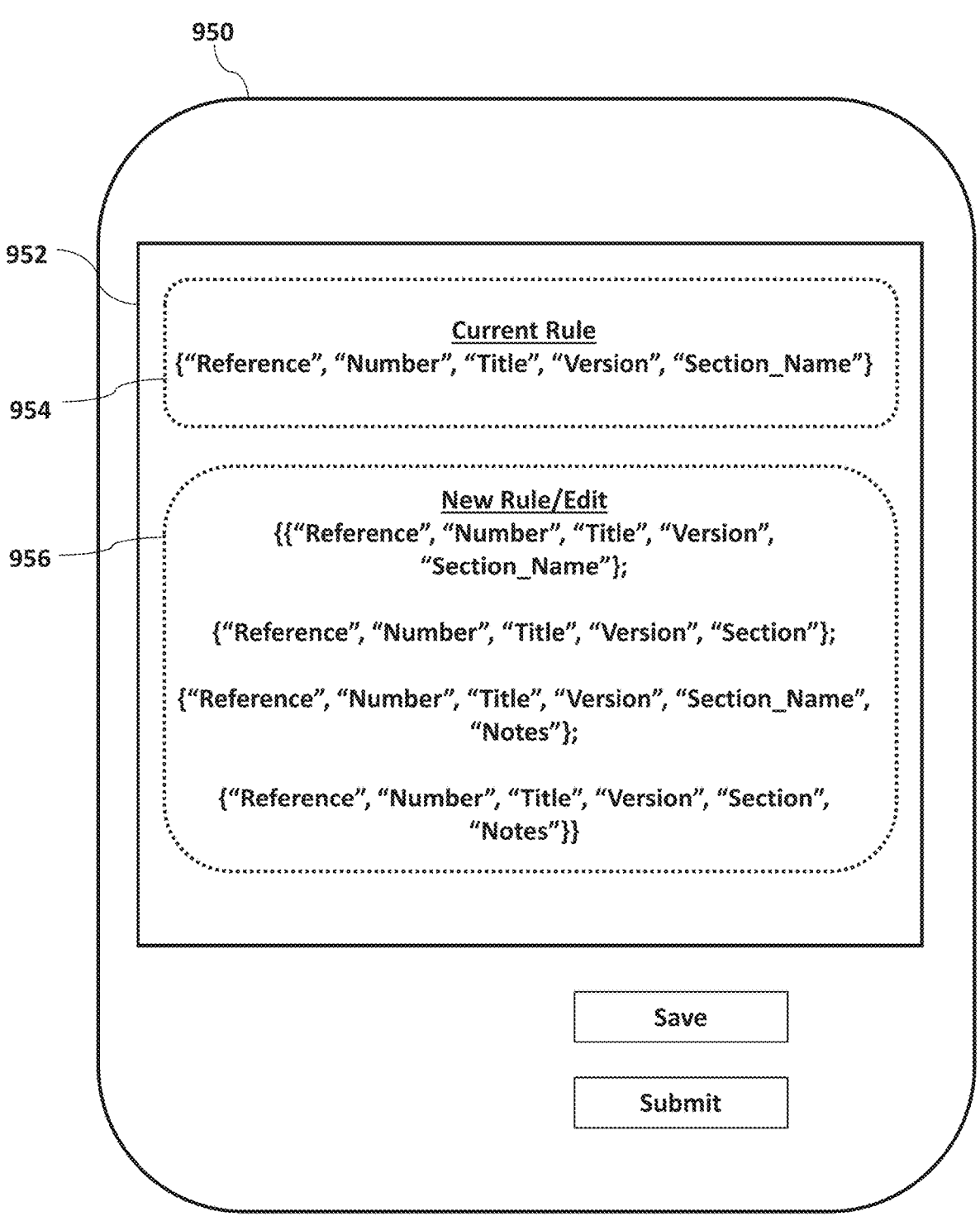

In some embodiments, rule updater 808 may update a rule based on feedback 414. The update to the rule may be input via a user interface 950 of FIG. 9B. For example user interface 950 may include a first region 952 whereby updates may be input. For instance, first region 952 of user interface 950 may include a first portion 954 displaying a current description of a rule and a second portion 956 displaying edits/updates to the current version of the rule. For example, if the current rule defines an acceptable structure of a document as { "Reference", "Number", "Title", "Version", "Section_Name"}, then the updates to the rule may indicate other acceptable structures a document may take. For example, the following listing may describe the updates to the rule:

{{"Reference", "Number", "Title", "Version", "Section_Name"};
{"Reference", "Number", "Title", "Version", "Section"};
{"Reference", "Number", "Title", "Version", "Section_Name", "Notes"};
{"Reference", "Number", "Title", "Version", "Section", "Notes"}}

The updates may be saved to rules database 174 and/or submitted for review by one or more other client devices 104.

Figure 10:
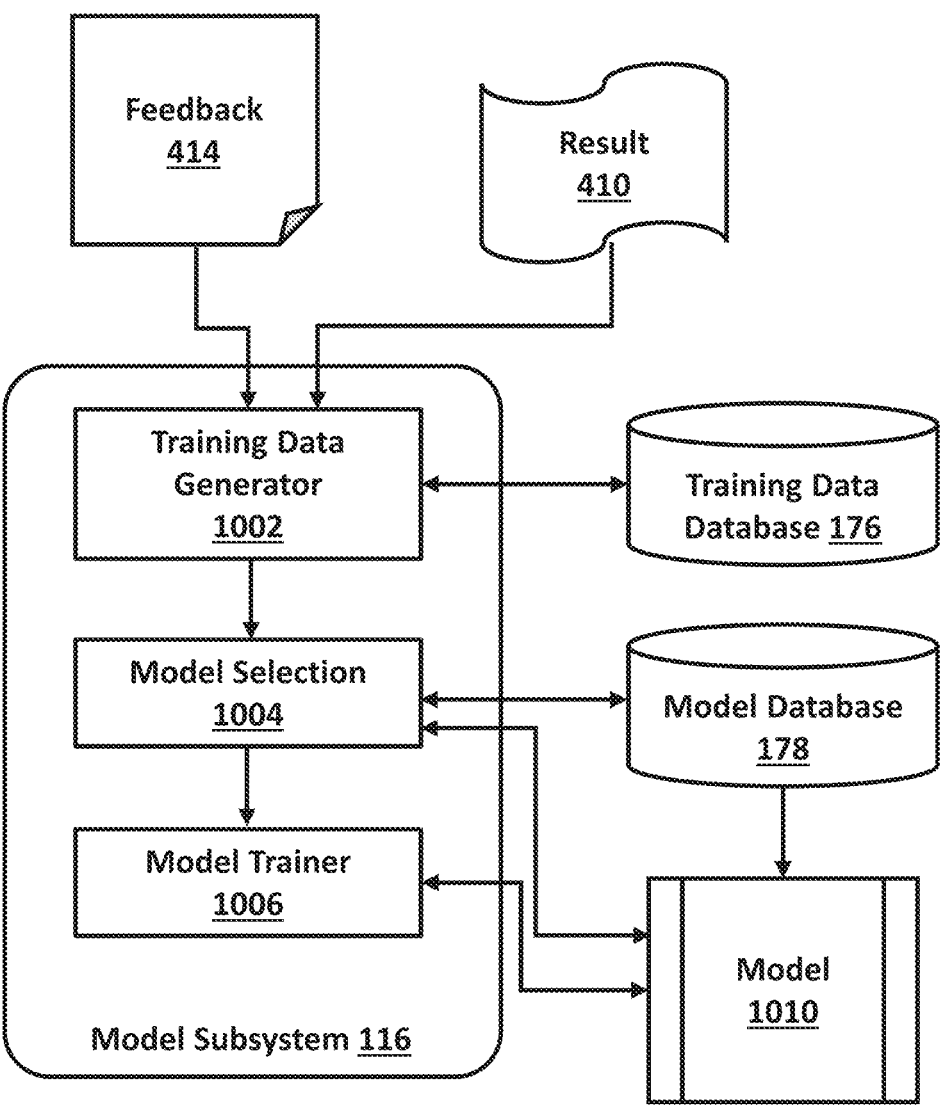
FIG. 10 is a diagram of a model subsystem used to train and execute a machine learning model, in accordance with various embodiments.

In some embodiments, model subsystem 116 may be configured to train, re-train, reset, or apply, one or more machine learning models for use by any of subsystems 110-114. As an example, with reference to FIG. 10, model subsystem 116 may include a training data generator 1002, a model selection process 1004, and model trainer 1006.

Training data generator 1002 may represent instructions for generating, updating, and selecting training data for use in training one or more machine learning models, such as model 1010. As an example, if model 1010 represents a natural language processing model, it may be trained to perform natural language understanding (NLU) for determining an intent, topic, and/or other characteristics of a given document's text. Training data generator 1002 may be configured to obtain a given document, one or more findings (such as finding 410) obtain based on an evaluation of the document against a set of domain-specific rules, feedback 414 regarding the findings, or other data, and may link that data together. For example, training data generator 1002 may link a first document may be analyzed against a first domain-specific rule, a first finding obtained as a result of evaluating the first document against the first domain-specific rule, and first feedback indicating whether the first finding is correct, incorrect, or requires an additional edit (such as requires an edit to the first domain-specific rule and/or an edit to the first document/first finding).

In some embodiments, the linked data may form a training document used to train model 1010. As an example, consider the first document mentioned above. The first finding may cause training data generator 1002 to generate a first label (such as a logical 0 or logical 1) indicating whether the first document was determined to comply with a first domain-specific requirement associated with the first domain-specific rule. The determined first finding may therefore serve as a "predicted" value for the first document being evaluated against the first domain-specific rule. The first feedback may indicate whether the predicted value was deemed to be accurate, indicating that model 1010 accurately predicted the first finding. The first feedback may cause training data generator 1002 to generate a second label (such as a logical 0 or logical 1) indicating whether the first finding's predicted value is accepted. In some embodiments, the document, data structure representing the structured domain-specific entities/values, a feature vector representing the topic/topics described by the document, etc., along with the predicted value label and the actual value label may be stored together to form a training document used to train model 1010 to predict whether a document will comply with a domain-specific requirement of a domain-specific rule.

In some embodiments, training data generator 1002 may generate training data for predicting a criticality level of a document. The criticality level may indicate how urgent it is for a document to be analyzed by one or more domain-specific rules. Documents determined to have a higher criticality level may be scheduled, using a document analysis scheduling system, for document analysis (such as an audit) in advance of documents determined to have a lower criticality level. The scheduling system may use the criticality level, document, findings, or other information to determine when an analysis of the document with respect to one or more domain-specific rules is to occur. In some embodiments, the criticality level of a document may be determined based on occurrences of one or more keywords indicative of a document being critical (such as the words "urgent," "immediate," "dangerous," etc.), whereas other keywords may indicate a document as being non-critical (such as "non-urgent," "slow-acting," "safe," etc.). Some embodiments include determining the criticality level of a document based on a topic or topics with which that document relates. For example, certain topics may be classified as being "urgent," and if it is determined that a document relates to one of the "urgent" topics, that document may be classified as having a particular criticality level. Some embodiments include determining a criticality level of a document based on prior labeled training data indicating documents and criticality levels of those documents. The generated training documents, also referred to interchangeably as training data, may be stored in training data database 176. The training data may be stored with metadata indicating domains related to a particular training document, a timestamp when the training document was analyzed, or other information.

Model selection process 1004 may indicate which model 1010 is to be retrieved for training, testing, or evaluating. In some embodiments, for instance when a model is to be trained, a user may submit a request, via client device 104, to train the model. The request may indicate a model type to be trained, training data to be used for training the model, or other information.

In some embodiments, model trainer 1006 may be configured to training model 1010 based on the training documents. In some embodiments, the first label and the second label may be compared to determine whether the predicted value matches the obtain value for a given document. This information may be used as reference feedback for updating weights, biases, or other hyperparameters of model 1010 to improve the accuracy of the model.

Flowcharts

FIG. 11 illustrates an example of a method 1100 of automatically validating unstructured documents having natural language text, in accordance with various embodiments.

At operation 1102, method 1100 may include accessing a document having unstructured data. For example, the document may include prose, such as alphanumeric characters. The document may relate to a particular domain. In some embodiments, the domain may be indicated by the document (such as the document may include a label indicating a related domain). In some embodiments, natural language processing may be applied to a document to identify one or more topics described by the document. The topics may then be used to determine a likely domain with which the document relates.

At operation 1104, method 1100 may include identifying a plurality of domain-specific entities and a corresponding entity value for each of the plurality of domain-specific entities. The domain-specific entities may be selected based on the domain identified as being related to the document. The plurality of domain-specific entities and the corresponding entity values may be parsed from the document. In some embodiments, natural language processing may be applied to recognize the domain-specific entities within the unstructured text and resolve the corresponding value(s) to each respective entity.

At operation 1106, method 1100 may include generating a dictionary, data structure, or other data. The dictionary, for example, may include structured data storing the domain-specific entities and the corresponding entity values assigned thereto.

At operation 1108, method 1100 may include evaluating a set of domain-specific rules (such as rules 500-540) against the structured data of the dictionary. Each domain-specific rule from the set of domain-specific rules may define a respective domain-specific requirement of the document. For example, a determination may be made whether a document has a structure matching that of a template document's structure.

At operation 1110, method 1100 may include generating a plurality of findings based on each of the evaluated set of domain-specific rules. Each finding may indicate whether a respective domain-specific requirement of a corresponding domain-specific rule has been met by the document. For example, a finding may indicate that a particular domain-specific requirement, such as that a document includes a title, has not been met by the document.

At operation 1112, method 1100 may include obtaining feedback indicating that at least a first finding is incorrect or is to be updated. This feedback may indicate that a first domain-specific rule corresponding to the first finding should be updated or removed. For example, the feedback may indicate that a first domain-specific rule produces inaccurate results, and thus should be removed from the set of domain-specific rules.

At operation 1114, the set of domain-specific rules may be updated based on the feedback. The updated set of domain-specific rules may include an update to or a deletion of the first domain-specific rule. For example, the set of domain-specific rules used to evaluate a given document may be updated such that the first domain-specific rule is removed from the set of domain-specific rules.

Examples of Systems and Computing Devices

Figure 12:
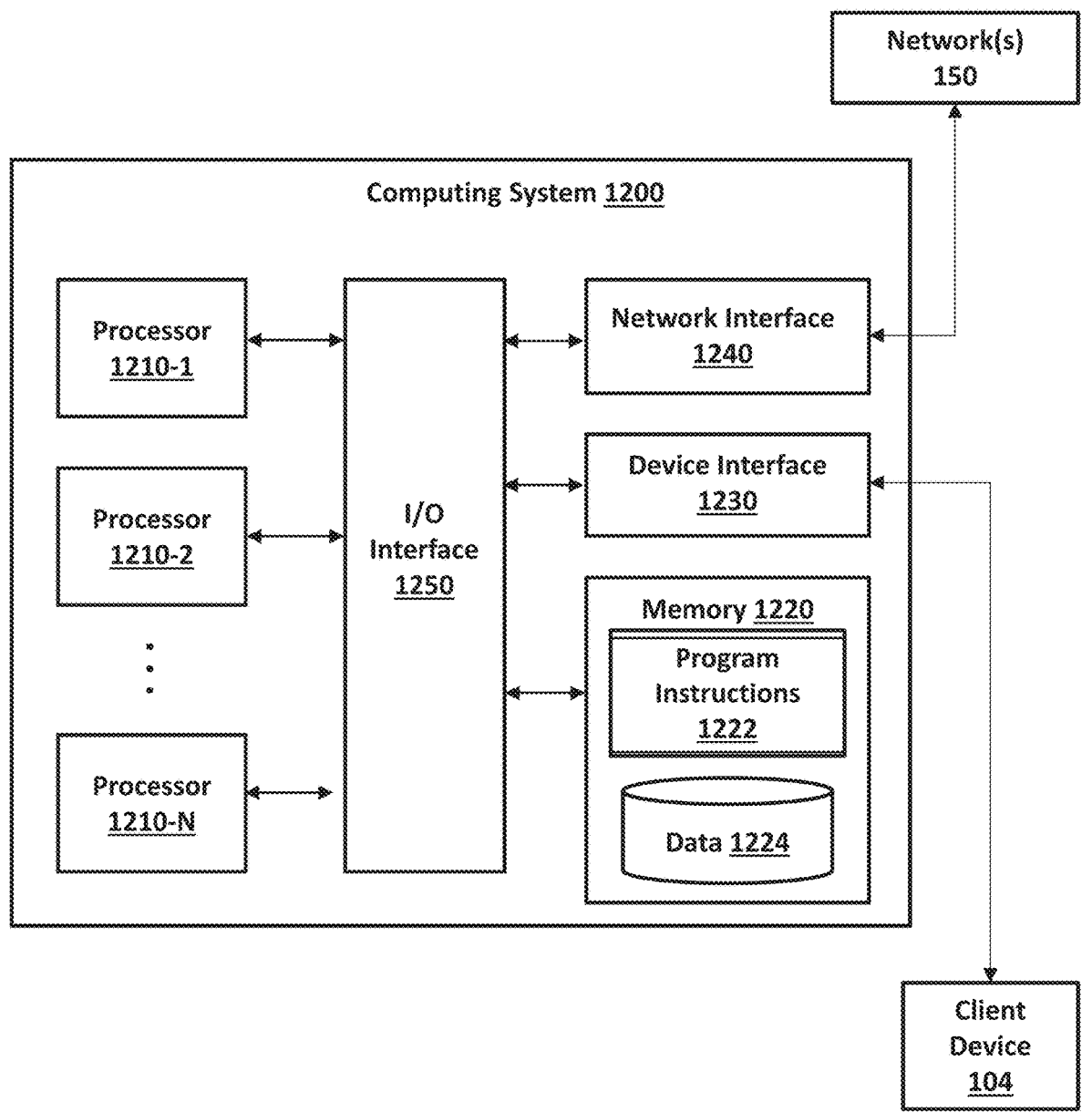
FIG. 12 illustrates an example of a computing system implemented by one or more of the features illustrated in FIG. 1, in accordance with various embodiments.

FIG. 12 illustrates an example of a computing system implemented by one or more of the features illustrated in FIG. 1, in accordance with various embodiments. Various portions of systems and methods described herein, may include or be executed on one or more computer systems similar to computing system 1200. Further, processes and modules described herein may be executed by one or more processing systems similar to that of computing system 1200. In some embodiments, computing system 102, client device 104, or other components of system 100 may include some or all of the components and features of computing system 1200.

Computing system 1200 may include one or more processors (for example, processors 1210-1-1210-N) coupled to system memory 1220, an input/output I/O device interface 1230, and a network interface 1240 via an input/output (I/O) interface 1250. A processor may include a single processor or a plurality of processors (for example, distributed processors). A processor may be any suitable processor capable of executing or otherwise performing instructions. A processor may include a central processing unit (CPU) that carries out program instructions to perform the arithmetical, logical, and input/output operations of computing system

1200. A processor may execute code (for example, processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (for example, system memory 1220). Computing system 1200 may be a uni-processor system including one processor (for example, processor 1210-1), or a multi-processor system including any number of suitable processors (for example, 1210-1-1210-N). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus may also be implemented as, special purpose logic circuitry, for example, an FPGA (field programmable gate array) or an ASIC (application specific integrated circuit). Computing system 1200 may include a plurality of computing devices (for example, distributed computer systems) to implement various processing functions.

I/O device interface 1230 may provide an interface for connection of one or more I/O devices (such as client device 104) to computing system 1200. I/O devices may include devices that receive input (for example, from a user) or output information (for example, to a user). I/O devices may include, for example, graphical user interface presented on displays (for example, a cathode ray tube (CRT) or liquid crystal display (LCD) monitor), pointing devices (for example, a computer mouse or trackball), keyboards, key-pads, touchpads, scanning devices, voice recognition devices, gesture recognition devices, printers, audio speakers, microphones, cameras, or the like. I/O devices may be connected to computing system 1200 through a wired or wireless connection. I/O devices may be connected to computing system 1200 from a remote location. I/O devices located on remote computer system, for example, may be connected to computing system 1200 via network interface 1240.

Network interface 1240 may include a network adapter that provides for connection of computing system 1200 to a network. Network interface may 1240 may facilitate data exchange between computing system 1200 and other devices connected to the network. Network interface 1240 may support wired or wireless communication. The network may include an electronic communication network, such as the Internet, a local area network (LAN), a wide area network (WAN), a cellular communications network, or the like.

System memory 1220 may store program instructions 1222 or data 1224. Program instructions 1222 may be executable by a processor (for example, one or more of processors 1210-1-1210-N) to implement one or more embodiments of the present techniques. Program instructions 1222 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (for example, one or more scripts stored in a markup language document), in a single file dedicated to the program in question, or in multiple coordinated files (for example, files that store one or more modules, sub programs, or portions of code). A computer program may be deployed to be executed on one or more computer processors located locally at one site or distributed across multiple remote sites and interconnected by a communication network.

System memory 1220 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (for example, flash memory, ROM, PROM, EPROM, EEPROM memory), volatile memory (for example, random access memory (RAM), static random access memory (SRAM), synchronous dynamic RAM (SDRAM)), bulk storage memory (for example, CD-ROM and/or DVD-ROM, hard-drives), or the like. System memory 1220 may include a non-transitory computer readable storage medium that may have program instructions stored thereon that are executable by a computer processor (for example, one or more of processors 1210-1-1210-N) to cause the subject matter and the functional operations described herein. A memory (for example, system memory 1220) may include a single memory device and/or a plurality of memory devices (for example, distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1250 may coordinate I/O traffic between processors 1210-1-1210-N, system memory 1220, network interface 1240, I/O devices, and/or other peripheral devices. I/O interface 1250 may perform protocol, timing, or other data transformations to convert data signals from one component (for example, system memory 1220) into a format suitable for use by another component (for example, processor 1210-1, processor 1210-2, . . . , processor 1210-N). I/O interface 1250 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 1200 or multiple computing systems 1200 configured to host different portions or instances of embodiments. Multiple computing systems 1200 may provide for parallel or sequential processing/execution of one or more portions of the techniques described herein.

Those skilled in the art will appreciate that computing system 1200 is merely illustrative and is not intended to limit the scope of the techniques described herein. Computing system 1200 may include any combination of devices or software that may perform or otherwise provide for the performance of the techniques described herein. For example, computing system 1200 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 1200 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (for example, as instructions or structured data) on a computer-accessible medium or a portable article to be read by an appropriate drive, various examples of which are described above. In some embodiments, instructions stored on a computer-accessible medium separate from computing system 1200 may be transmitted to computing system 1200 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (for example, content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to cost constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (in other words, meaning having the potential to), rather than the mandatory sense (in other words, meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, in other words, encompassing both "and" and "or." Terms describing conditional relationships, for example, "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, for example, "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, for example, the antecedent is relevant to the likelihood of the consequent occurring. Statements in which a plurality of attributes or functions are mapped to a plurality of objects (for example, one or more processors performing steps A, B, C, and D) encompasses both all such attributes or functions being mapped to all such objects and subsets of the attributes or functions being mapped to subsets of the attributes or functions (for example, both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B may include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, in other words, each does not necessarily mean each and every. Limitations as to sequence of recited steps should not be read into the claims unless explicitly specified, for example, with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (for example, "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, for example, reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, for example, text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and may be implemented in the form of data that causes functionality to be invoked, for example, in the form of arguments of a function or API call. To the extent bespoke noun phrases are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (for example, articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

This written description uses examples to disclose the embodiments, including the best mode, and to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for automatically validating unstructured documents having natural language text, the method being implemented by one or more processors executing computer program instructions, the method comprising:

accessing a document having unstructured text, the document relating to a particular domain;

identifying a plurality of domain-specific entities and a corresponding entity value for each of the plurality of domain-specific entities, the plurality of domain-specific entities and the corresponding entity values being parsed from the document;

generating a dictionary comprising structured data that stores the plurality of domain-specific entities and the corresponding entity values;

evaluating a set of domain-specific rules against the dictionary, each domain-specific rule from the set of domain-specific rules defining a respective domain-specific requirement of the document;

generating, based on each of the evaluated set of domain-specific rules, a plurality of findings based on the evaluated set of domain-specific rules, each finding from the plurality of findings indicating whether the respective domain-specific requirement has been met by the document, wherein a first domain-specific rule defines a first domain-specific requirement for the document;

determining, based on the first domain-specific requirement, whether content described by the document satisfies a similarity condition, wherein the similarity condition being satisfied comprises a first similarity metric being less than or equal to a second similarity metric, wherein: the first similarity metric is computed by determining how similar topics described by the unstructured text of the document are a set of topics determined to be described by a plurality of previously analyzed documents, and the second similarity metric is computed by determining how similar keywords included within the unstructured text of the document are to a set of keywords determined to be included within unstructured text of the plurality of previously analyzed documents;

obtaining feedback indicating that at least a first finding is incorrect or is to be updated, indicating that the first domain-specific rule corresponding to the first finding should be updated or removed; and updating, based on the feedback, the set of domain-specific rules to obtain an updated set of domain-specific rules, wherein the updated set of rules comprises an update to or deletion of the first domain-specific rule.

2. The method of claim 1, wherein the feedback comprises an indication that the first domain-specific rule is not needed, and wherein updating the set of domain-specific rules comprises: deleting the first domain-specific rule from the set of domain-specific rules.

3. The method of claim 1, wherein the feedback comprises an indication the first domain-specific rule is to be modified to include or exclude a required value for a first domain-specific entity associated with the first domain-specific rule, and wherein updating the set of domain-specific rules comprises: updating the first domain-specific rule to include or exclude the required value.

4. The method of claim 1, wherein the first domain-specific rule defines a first domain-specific requirement for the document, the method further comprises:

determining, based on the first domain-specific requirement, whether a structure of the document matches a predefined document structure, wherein the predefined document structure indicates a set of characteristics that define a format of the unstructured text is expected to have.

5. The method of claim 1, wherein the first domain-specific rule defines a first domain-specific requirement for the document, the method further comprises:

determining, based on the first domain-specific requirement, whether a first entity value of a first domain-specific entity from the plurality of domain-specific entities is included within a predefined list of values specified as being a valid entity value for the first domain-specific entity.

6. The method of claim 5, further comprising:

identifying an entity described within the unstructured text of the document;

determining, based on the particular domain of the document, whether the entity is included within unstructured text of one or more other documents also related to the particular domain;

determining, based on a number of occurrences of the entity being included within the unstructured text of each of the one or more other documents related to the particular domain, whether the number of occurrences satisfies a rule generation condition, wherein the rule generation condition being satisfied comprises the number of occurrences being greater than a threshold number of occurrences; and responsive to determining that the rule generation condition is satisfied, generating a new domain-specific rule to be added to the set of domain-specific rules, wherein the new domain-specific rule defines a domain-specific requirement that the first domain-specific entity and the entity value are included within unstructured text of a given document.

7. The method of claim 1, further comprising:

prior to the document being accessed, obtaining the plurality of previously analyzed documents, wherein each of the plurality of previously analyzed documents includes unstructured text:

determining, using a classifier trained to identify topics within unstructured text, that the unstructured text included by the plurality of previously analyzed documents describe the set of topics;

detecting, using the classifier, one or more topics described by the unstructured text of the document; and determining whether the one or more topics and the set of topics satisfy a text summarization threshold, wherein the text summarization threshold being satisfied comprises the set of topics including at least the one or more topics.

8. The method of claim 1, further comprising:

prior to the document being accessed, obtaining the plurality of previously analyzed documents, wherein each of the plurality of previously analyzed documents includes unstructured text;

determining the set of keywords based on a frequency with which each keyword of the set of keywords is included within the unstructured text of the plurality of previously analyzed documents;

detecting occurrences of each keyword of the set of keywords within the unstructured text of the document; and determining whether the detected occurrences of each keyword of the set of keywords satisfies a keyword presence threshold, wherein the keyword presence threshold being satisfied comprises a threshold amount of keywords from the set of keywords being included within the unstructured text of the document.

9. The method of claim 1, further comprising:

deriving a new domain-specific rule based on the plurality of findings;

obtaining feedback indicating whether the new domain-specific rule is to be added to the set of domain-specific rules; and one of: updating the set of domain-specific rules to include the new domain-specific rule based on the feedback, or maintaining the set of domain-specific rules.

10. The method of claim 1, wherein the feedback comprise unstructured text, the method further comprises:

applying natural language processing to the unstructured text of the feedback to determine an intent of the text, wherein the natural language processing comprises performing named entity recognition and entity resolution to identify one or more domain-specific entities from a predefined list of domain-specific entities related to the particular domain and assigning entity values to each of the one or more identified domain-specific entities; and determining, based on the intent of the unstructured text of the feedback, whether the respective domain-specific requirement of a corresponding domain-specific rule of the set of domain-specific rules has been met.

11. The method of claim 1, further comprising:

selecting, from a plurality of domains, the particular domain as being a domain related to the document based on an intent of the unstructured text of the document, wherein the particular domain of the document is determined based on the intent of the unstructured text of the document.

12. The method of claim 11, further comprising:

determining an additional intent determined as being related to the document; selecting, form the plurality of domains, an additional domain that is related to the additional intent, the additional domain being different from the intent of the unstructured text of the document;

identifying an additional plurality of domain-specific entities to analyze the document against;

determining a corresponding entity value for each domain-specific entity of the additional plurality of domain-specific entities, the additional plurality of domain-specific entities and the corresponding entities values being parsed from the document, wherein the dictionary comprises additional structured data that stores the additional plurality of domain-specific entities and the corresponding values;

evaluating an additional set of domain-specific rules against the dictionary, each domain-specific rule from the additional set of domain-specific rules defining an additional respective-domain-specific requirement of the document;

generating, based on each of the evaluated additional set of domain-specific rules, an additional plurality of findings, each finding from the additional plurality of findings indicating whether the additional respective domain-specific requirement has been met by the document, wherein the feedback further indicates whether at least a second finding from the additional plurality of finds is incorrect or is to be updated, indicating that a second domain-specific rule corresponding to the second finding should be updated or removed; and updating, based on the feedback, the additional set of domain-specific rules to obtain an additional updated set of domain-specific rules, wherein the additional updated set of rules comprises an update to or deletion of the second domain-specific rule.

13. The method of claim 1, further comprising:

storing the updated set of domain-specific rules, wherein responsive to receiving a request to execute the set of domain-specific rules against a plurality of documents, a script is run to cause the updated set of domain-specific rules to be executed against the plurality of documents.

14. The method of claim 1, further comprising: generating the set of domain-specific rules.

15. The method of claim 1, further comprising:

receiving a request to execute a new domain-specific rule against the document;

incrementing a counter tracking a number of occurrences of the request to execute the new domain-specific rule being submitted;

determining a current number of occurrences of the request to execute the new domain-specific rule being submitted based on the incremented counter;

determining whether the current number of occurrences is greater than or equal to a threshold number of occurrences; and adding the new domain-specific rule to the updated set of rules such that subsequent executions of the updated set of domain-specific rules against a given documents includes the new domain-specific rule being applied against the given document.

16. The method of claim 1, further comprising:

receiving training documents each comprising a label indicating a criticality level of that training document;

training a machine learning model to predict a criticality level of a given document based on the training documents;

responsive to a new document being obtained, providing the new document to the trained machine learning model to obtain a result indicating a predicted criticality level of the new document;

receiving additional feedback comprising an update to the predicted criticality level of the new document indicating that the predicted criticality level of the new document was incorrect;

determining, based at least in part on the update to the predicted criticality level of the new document indicating that the predicted criticality level of the new document was incorrect, an accuracy of the trained machine learning model;

determining whether the accuracy of the trained machine learning model satisfies a threshold training condition, wherein satisfaction of the threshold training condition comprises a score representing the accuracy of the trained machine learning model being less than a threshold accuracy score; and causing at least one of: the trained machine learning model to be retrained or the training documents to be updated.

17. The method of claim 16, further comprising:

obtaining, for each training document of a plurality of training documents, an indication of a criticality level of that training document;

storing a label in association with each training document of a plurality of training documents, wherein the label represents the criticality level of a respective training document;

generating training data for training a machine learning model to predict a criticality level of a given document, wherein the training data comprises, for each training document, a feature vector formed from structured text of the respective training document and the label stored in association with the respective training document;

training, using the training data, the machine learning model to obtain a trained machine learning model;

accessing an additional document having unstructured text, the additional document relating to the particular domain;

identifying at least some of the plurality of domain-specific entities and respective entity values from the unstructured text of the additional document;

generating a feature vector representing the at least some of the plurality of domain-specific entities and the respective entity values;

providing the feature vector, as input, to the trained machine learning model to determine a criticality level of the new document;

obtaining a result from the trained machine learning model representing the criticality level of the new document predicted by the trained machine learning model; and providing the result to a scheduling system configured to determine a schedule of documents to be analyzed for findings with respect to the set of domain-specific rules.

18. The method of claim 17, further comprising:

obtaining responses from a plurality of client devices indicating whether the result obtained via the trained machine learning model is accurate, wherein the responses comprises a binary notification having a first value or a second value, the first value indicating that a given response classified the result as being accurate and the second value indicating that a given response classified the result as being inaccurate;

determining whether the responses indicates that a respective result is accurate, wherein the result is determined to be accurate based on the respective binary notification obtained from the responses; and updating the respective result to a revised result based on the responses.

19. A system for automatically validating unstructured documents having natural language text, comprising:

a processor programmed to:

access a document having unstructured text, the document relating to a particular domain;

identify a plurality of domain-specific entities and a corresponding entity value for each of the plurality of domain-specific entities, the plurality of domain-specific entities and the corresponding entity values being parsed from the document;

generate a dictionary comprising structured data that stores the plurality of domain-specific entities and the corresponding entity values;

evaluate a first set of domain-specific rule against the dictionary, wherein the first domain-specific rule defines a first domain-specific requirement for the document;

determine, based on the first domain-specific requirement, whether a first entity value of a first domain-specific entity from the plurality of domain-specific entities is included within a predefined list of values specified as being a valid entity value for the first domain-specific entity;

identify an entity described within the unstructured text of the document;

determine, based on the particular domain of the document, whether the entity is included within unstructured text of one or more other documents also related to the particular domain;

determine, based on a number of occurrences of the entity being included within the unstructured text of each of the one or more other documents related to the particular domain, whether the number of occurrences satisfies a rule generation condition, wherein the rule generation condition being satisfied comprises the number of occurrences being greater than a threshold number of occurrences; and responsive to the determination that the rule generation condition is satisfied, generate a new domain-specific rule to be added to the set of domain-specific rules, wherein the new domain-specific rule defines a domain-specific requirement that the first domain-specific entity value and the entity are included within unstructured text of a given document.

* * * * *